United States Patent
Hamabe

(10) Patent No.: US 6,405,021 B1
(45) Date of Patent: Jun. 11, 2002

(54) METHOD OF CONTROLLING TRANSMISSION POWER IN CELLULAR SYSTEM AND BASE STATION APPARATUS

(75) Inventor: Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/270,876

(22) Filed: Mar. 17, 1999

(30) Foreign Application Priority Data

Mar. 27, 1998 (JP) .......................................... 10-081862
Jan. 27, 1999 (JP) .......................................... 11-018815

(51) Int. Cl.$^7$ ................................................. H04B 7/00
(52) U.S. Cl. ........................ 455/69; 455/522; 370/318; 370/342
(58) Field of Search ........................ 455/67.1, 69, 561, 455/522, 38.3, 67.3, 68, 403, 550, 574, 33.1–33.2, 38.1–38.2, 517, 92, 434, 815, 88, 572, 352, 353; 370/335, 342, 441, 18, 95.1, 331, 336, 337, 397

(56) References Cited

U.S. PATENT DOCUMENTS

| | | | |
|---|---|---|---|
| 5,056,109 A | | 10/1991 | Gilhousen et al. |
| 5,101,501 A | | 3/1992 | Gilhousen et al. |
| 5,455,967 A | | 10/1995 | Amezawa et al. |
| 5,566,165 A | * | 10/1996 | Sawahashi et al. ........... 370/18 |
| 5,852,782 A | * | 12/1998 | Komatsu .................... 455/522 |
| 5,893,035 A | * | 4/1999 | Chen ........................... 455/522 |
| 5,898,682 A | * | 4/1999 | Kanai .......................... 370/331 |
| 6,118,983 A | * | 9/2000 | Egusa et al. ................... 455/69 |
| 6,163,705 A | * | 12/2000 | Miya ........................... 455/522 |
| 6,173,162 B1 | * | 1/2001 | Dahnman et al. ............. 455/69 |
| 6,212,364 B1 | * | 4/2001 | Park ............................. 455/69 |

FOREIGN PATENT DOCUMENTS

| | | | | |
|---|---|---|---|---|
| EP | 0 645 940 A1 | | 3/1995 | |
| EP | 0680160 A3 | * | 11/1995 | ........... H04B/7/005 |
| JP | 8-18503 | | 1/1996 | |
| JP | 8-32515 | | 2/1996 | |
| JP | 9-261170 | | 10/1997 | |
| JP | 9-312609 | | 12/1997 | |
| JP | 10-32540 | | 2/1998 | |
| WO | 9717769 | * | 5/1997 | ........... H04B/7/005 |

OTHER PUBLICATIONS

TIA/EIA Interim Standard, Mobile Station—Base Station Compatibility Standard for Dual–Mode Wideband Spread Spectrum Cellular System, TIA/EIA/IS–95–A, Telecommunication Industry Association, May 1995, 6.6.6.2.7.2 Reverse Traffic Channel Power Control During Soft Handoff.

Andersson, "Tuning the macro diversity performance in a DS–CDMA system", Proc. IEEE 44th Vehicular Technology Conference, pp. 41–45, Jun. 1994.

* cited by examiner

*Primary Examiner*—Daniel Hunter
*Assistant Examiner*—Pablo N Tran
(74) *Attorney, Agent, or Firm*—Scully, Scott, Murphy & Presser

(57) ABSTRACT

A signal is prevented from being transmitted from a mobile station to a base station with excessive transmission power for thereby increasing an uplink capacity. The base station compares the reception quality of the signal transmitted from the mobile station with target reception quality, and determines an increment for transmission power of the base station based on a compared result. The base station adds the increment to the transmission power of the base station based on a second control command transmitted from the mobile station, and transmits a first control command for controlling transmission power of the mobile station with the transmission power to which the increment has been added. If the reception quality of the signal transmitted from the mobile station becomes greater than the target reception quality, then the increment for the transmission power is increased. If the reception quality of the signal transmitted from the mobile station becomes smaller than the target reception quality, then the increment for the transmission power is reduced.

110 Claims, 16 Drawing Sheets

METHOD OF CONTROLLING TRANSMISSION POWER IN CELLULAR SYSTEM AND BASE STATION APPARATUS

BACKGROUND OF THE INVENTION

1. Field of the Invention

The present invention relates to a method of controlling the transmission power in a cellular system wherein a plurality of mobile stations communicate bidirectionally with each other via a base station situated in a service area, and a base station apparatus in such a base station.

2. Description of the Related Art

In a cellular system which employs a code division multiple access (CDMA) process for radio communications, a number of base stations and mobile stations communicate bidirectionally with each other in respective established links at the same frequency. The received power (desired power) of a signal in a certain link acts as interference power that disturbs other links. In an uplink transmission where a mobile station transmits a signal and a base station receives the transmitted signal, when the desired power exceeds a predetermined power level, the interference power increases, thus reducing the link capacity.

To prevent the above phenomenon from occurring, it is necessary to strictly control the transmission power of mobile stations. According to one uplink transmission power control process, the desired power from a mobile station is measured by a base station and the measured level of the desired power is compared with a control target level. If the measured level of the desired power is greater than the control target level, then the base station transmits a control command for reducing the transmission power to the mobile station. Conversely, if the measured level of the desired power is smaller than the control target level, then the base station transmits a control command for increasing the transmission power to the mobile station. This transmission power control process is discussed in detail in U.S. Pat. No. 5,056,109 entitled "Method and apparatus for controlling the transmission power in a CDMA cellular system", issued to Gilhousen et al.

According to the above transmission power control process, however, if a control command transmitted from a base station to a mobile station is judged erroneously so as to increase or reduce the transmission power in a manner opposite to the control command, then the desired power may become excessive or insufficient in level. If the desired power becomes excessive, then the interference power which affects other links increases. If the desired power becomes insufficient, then the quality in the link decreases.

Japanese unexamined patent publication No. 1997-312609 discloses a process of ignoring a received control command if the quality of the received control command is poor, so that the transmission power from a mobile station will be prevented from increasing or decreasing in a wrong direction for thereby alleviating the above drawback.

Code division multiple access (CDMA) cellular systems use a technique known as "soft handoff" which allows a mobile station, as it moves from one cell to another, to communicate with a plurality of base stations in the vicinity of the boundary of the cells while changing links. The soft handoff is disclosed in detail in U.S. Pat. No. 5,101,501 entitled "Method and system for providing a soft handoff in communications in a CDMA cellular telephone system", issued to Gilhousen et al.

According to an uplink transmission power control process with a soft handoff function, a plurality of base stations measure the desired power from a mobile station, and independently transmit respective control commands based on the measured levels of the desired power to the mobile station via downlinks. When the mobile station receives the control commands from the respective base stations, the mobile station controls the transmission power based on the received control commands. If the mobile station receives different control commands, then the mobile station controls the transmission power based on the control command for reducing the transmission power. This process is described in TIA/EIA Interim Standard, Mobile Station—Base Station Compatibility Standard for Dual-Mode Wideband Spread Spectrum Cellular System, TIA/EIA/IS-95-A, Telecommunication Industry Association, May 1995, 6.6.6.2.7.2 Reverse Traffic Channel Power Control During Soft Handoff.

As described above, if the mobile station receives different command signals transmitted from the respective base stations, then the mobile station controls the transmission power on the basis of the control command for reducing the transmission power, from among the control commands transmitted from the respective base stations and received by the mobile station. Therefore, the desired power does not exceed a control target level in any of the base stations, for thereby achieving a high uplink capacity. In this process, consequently, it is important to reduce the probability that the mobile station will fail to receive a control command for reducing the transmission power.

In a downlink transmission where a base station transmits a signal and a mobile station receives the transmitted signal, the transmission power from the base station is controlled to achieve a predetermined ratio between the desired power and the interference power for thereby accomplishing a high link capacity.

According to the uplink transmission power control, as described above, the base stations independently transmit respective control commands for controlling the transmission power to the mobile station via downlinks. It is important that, while the soft handoff function is being performed, the downlink transmission power be controlled in order for the mobile station to be able to receive control commands transmitted from the base stations.

One solution is to control at the mobile station the downlink transmission power levels for equalizing respective desired power levels from the base stations. According to this solution, in those base stations which suffer a large downlink propagation loss, the transmission power is set to a correspondingly large level. Therefore, the interference power increases, resulting in a reduction in the downlink capacity. Such a reduction in the downlink capacity can be suppressed by controlling the transmission power levels so as to equalize transmission power levels from the base stations, as disclosed in Anderson, "Tuning the macro diversity performance in a DS-CDMA system," Proc. IEEE 44th Vehicular Technology Conference, pp. 41–45, June 1994.

According to the above transmission power control scheme, however, the desired power levels from the base stations which suffer a large downlink propagation loss are so reduced that the mobile station is more likely to fail to receive control commands from those base stations and hence it is more probable that the mobile station will fail to receive control commands to reduce the transmission power.

Instantaneous level variations of the propagation loss differ from frequency to frequency. In a system where different frequencies are employed for uplink and downlink transmissions, uplink and downlink propagation losses differ from each other. Therefore, on the assumption that an uplink propagation loss from a mobile station to a base station is small and the desired power received by the base station is greater than a control target level, when a control command for reducing the transmission power is transmitted from the base station to the mobile station, if a downlink propagation loss from the base station to the mobile station is larger, then the desired power received by the mobile station is smaller, with the result that the mobile station may possibly fail to receive the transmitted control command for reducing the transmission power.

If all control commands transmitted from other base stations to the mobile station at this time are for reducing the transmission power, then the transmission power is increased by the mobile station, and the desired power in the base station which has transmitted the control command that the mobile station has failed to receive becomes excessive. Consequently, the interference power will be greater than if the mobile station had successfully received the control command and controlled the transmission power accordingly, resulting in a reduction in the uplink capacity of the base station.

According to the above solution to control the downlink transmission power levels for equalizing respective desired power levels from the base stations in the mobile station, therefore, the possibility that the base station will be able to receive all control commands transmitted from the base stations is lowered, resulting in a reduction in the uplink capacity. According to a process disclosed in Japanese unexamined patent publication No. 1997-261170, the above problem can be solved as follows: When a control command for reducing the transmission power of a mobile station is transmitted from a base station, the transmission power of the control command transmitted from the base station is set to a level higher than the levels of other commands, so that the mobile station will be able to receive, with a greater probability, the control command from the base station.

While the soft handoff function is being performed, it is of importance that a mobile station control the transmission power according to a control command transmitted from a base station with a low propagation loss so that the desired power in the base station will be equalized to a control target level. However, on the assumption that the mobile station fails to receive a control command transmitted from a base station with a high propagation loss and recognizes a control command for increasing the transmission power erroneously as a control command for reducing the transmission power, then even if a control command transmitted from a base station with a low propagation loss is for increasing the transmission power, the mobile station preferentially controls the transmission power based on the control command for reducing the transmission power, and hence the base station suffers a shortage of the desired power and a reduction in the link quality. However, the process disclosed in Japanese unexamined patent publication No. 1997-312609 is capable of lessening the above difficulty because it ignores a received control command if the quality of the received control command is poor, and is less adversely affected by errors in determining control commands of low reliability from base stations with a high propagation loss.

The invention disclosed in Japanese unexamined patent publication No. 1997-261170, as it is related to the present invention, will be described below with reference to FIGS. 1 through 6 of the accompanying drawings.

FIG. 1 of the accompanying drawings is a flowchart of a process for a base station to receive a frame error rate reported from a mobile station, determine a downlink transmission power level, and transmit a control command for an uplink transmission power level.

As shown in FIG. 1, when the base station is to start communicating with the mobile station, the base station sets the downlink transmission power Pf which is determined depending on a frame error rate to an initial level Pf0 in step S1201. The frame error rate is reported at given intervals from the mobile station.

If there is a newly reported frame error rate in step S1202 and the newly reported frame error rate is greater than a predetermined range in step S1203, then the base station increments the downlink transmission power Pf by $\Delta P$ (>0) in step S1204. If the newly reported frame error rate is smaller than the predetermined range in step S1205, then the base station decrements the downlink transmission power Pf by $\Delta P$ in step S1206.

If there is no newly reported frame error rate in step S1202, then the base station maintains the downlink transmission power Pf as it is. Thereafter, control goes to step S1207.

In step S1207, if a measured level D of uplink desired power which is measured in each frame is greater than a predetermined control target level T, then the base station determines a control command for reducing uplink transmission power in step S1208, and equalizes the downlink transmission power P to Pf+Padd in step S1209, where Padd represents a transmission power increment of predetermined constant value.

Conversely, if the measured level D of uplink desired power is smaller than the predetermined control target level T in step S1207, then the base station determines a control command for increasing the uplink transmission power in step S1210, and equalizes the downlink transmission power P to the downlink transmission power Pf which is determined depending on the frame error rate in step S1211.

The base station then transmits the control command for the uplink transmission power to the mobile station with the downlink transmission power P in step S1212. Thereafter, control repeats the processing from step S1202.

A mobile station which is establishing a link with a single base station controls the uplink transmission power according to a control command that is transmitted from the base station for the uplink transmission power. A mobile station which is simultaneously establishing links with two base stations receives two control commands that are transmitted from the respective base stations for the uplink transmission power. If the control commands are different from each other, then the mobile station controls the uplink transmission power according to the control command for reducing the uplink transmission power.

According to the above transmission power control process shown in FIG. 1, while the soft handoff function is being performed, the base stations, i.e., main and auxiliary base stations, receive the same frame error rate which has been reported and similarly increase or reduce the downlink transmission power Pf which is determined depending on the frame error rate. Therefore, the downlink transmission power Pf is equalized by the base stations. When the base stations are to transmit control commands for reducing the uplink transmission power to the mobile station, the base stations establish the downlink transmission power P so as to be greater than the downlink transmission power Pf, determined depending on the frame error rate, by the transmission power increment Padd. The transmission power control process is thus capable of reducing the probability that the mobile station fails to receive a control command for reducing the uplink transmission power, and the uplink excessively interferes with the other links.

FIGS. 2A and 2B of the accompanying drawings illustrate a flowchart of a process for a base station to receive the reception power Q of a pilot signal, measured in each frame, reported from a mobile station, determine a downlink transmission power level, and transmit a control command for an uplink transmission power level.

As shown in FIGS. 2A and 2B, when the base station is to start communicating with the mobile station, the base station sets the downlink transmission power Pf which is determined depending on a frame error rate to an initial level Pf0 in step S1301. The frame error rate is reported at given intervals from the mobile station.

If there is a newly reported frame error rate in step S1302 and the newly reported frame error rate is greater than a predetermined range in step S1303, then the base station increments the downlink transmission power Pf by $\Delta P$ (>0) in step S1304. If the newly reported frame error rate is smaller than the predetermined range in step S1305, then the base station decrements the downlink transmission power Pf by $\Delta P$ in step S1306.

If there is no newly reported frame error rate in step S1302, then the base station maintains the downlink transmission power Pf as it is. Thereafter, control goes to step S1307.

In step S1307, if a measured level D of uplink desired power which is measured in each frame is greater than a predetermined control target level T, then the base station determines a control command for reducing uplink transmission power in step S1308. If the reception power Q of a pilot signal of its own station is not maximum in step S1309, then the base station equalizes the downlink transmission power P to Pf+Padd in step S1310, where Padd represents a transmission power increment of predetermined constant value.

If the reception power Q of the pilot signal is maximum in step S1309, then the base station equalizes the downlink transmission power P to the downlink transmission power Pf which is determined depending on the frame error rate in step S1312.

If the measured level D of uplink desired power is smaller than the predetermined control target level T in step S1307, then the base station determines a control command for increasing the uplink transmission power in step S1311, and thereafter equalizes the downlink transmission power P to the downlink transmission power Pf which is determined depending on the frame error rate in step S1312.

The base station then transmits the control command for the uplink transmission power to the mobile station with the downlink transmission power P in step S1313. Thereafter, control repeats the processing from step S1302.

According to the above transmission power control process shown in FIGS. 2A and 2B, when a base station is to transmit a control command for reducing uplink transmission power to a mobile station, only if the mobile station is highly likely to fail to receive the control command for reducing uplink transmission power unless downlink transmission power P is increased because the reception power Q of a pilot signal of its own station is not maximum, then the base station increases the downlink transmission power P by a transmission power increment Padd.

Therefore, the probability that excessive uplink interference is caused due to a failure by the mobile station to receive a control command for reducing uplink transmission power is reduced, and the interference power is prevented from increasing owing to an increase in the downlink transmission power P.

FIG. 3 of the accompanying drawings is a flowchart of a process of determining a transmission power increment Padd in a conventional transmission power control process.

As shown in FIG. 3, a base station receives reception power Q of pilot signals of main and auxiliary base stations reported from a mobile station in step S1401.

The base station regards the reception power of a pilot signal of its own station, reported from the mobile station, as Q0, in step S1402, and also regards the reception power of pilot signals of other base stations, reported from the mobile station, as Qi (i=1–N–1 where N is the sum of the number of main base stations and the number of auxiliary base stations) in step S1403.

Then, the base station sets a counter i to 1 in step S1404, and sets the maximum level Qmax for the reception power of pilot signals to Qi in step S1405.

If the counter i is not the same as (N–1) in step S1406, then the base station increments the counter i by 1 in step S1407. If the reception power Qi of pilot signals is greater than the maximum level Qmax in step S1408, then control goes back to step S1405, and the maximum level Qmax is set to Qi.

If the reception power Qi of pilot signals equal to or smaller than the maximum level Qmax in step S1408, then control goes back to step S1406.

If the counter i is the same as (N–1) in step S1406, then the base station sets the transmission power increment Padd to (Qmax–Q0) in step S1409. Thereafter, the process shown in FIG. 3 comes to an end.

In this manner, the maximum level Qmax for the reception power Qi of pilot signals is searched for, and the transmission power increment Padd is determined as Padd= (Qmax–Q0).

According to the process shown in FIG. 3, when a base station is to transmit a control command for reducing uplink transmission power to a mobile station at the time the reception power Q0 of a pilot signal of its own station is not maximum, the base station establishes downlink transmission power P so as to be greater than with respect to the base station whose pilot signal reception power Qi is maximum, by the reduction in the reception power Q0 of the pilot signal of its own station, i.e., the increase in the propagation loss. Therefore, a measured level D of desired power in the mobile station becomes the same as the levels of desired power which would be achieved by control commands for uplink transmission power from other base stations.

Inasmuch as the downlink transmission power P is increased by a level necessary for lowering the probability that the mobile station fails to receive a control command for reducing the uplink transmission power, the downlink interference power is further prevented from increasing.

FIG. 4 of the accompanying drawings is a flowchart of a process for an exchange to receive a measured level D of desired power which is indicated, determine a control command for uplink transmission power, and send the determined control command to a base station.

As shown in FIG. 4, an exchange receives measured levels Di (i=0–N–1) of desired power reported from respective base stations in step S1501.

The exchange also receives control target levels Ti (i=0– N–1) of desired power reported from the respective base stations in step S1502. Here, it is assumed that the control target levels Ti of desired power are of a constant value common to all the base stations.

Then, the exchange sets a counter i to 0 in step S1503. If the difference (Di−Ti) between the measured level Di of desired power of the ith base station and the control target level Ti of desired power of the ith base station is not greater than 0 in step S1504, then the exchange compares the value of the counter i with (N−1) in step S1505. If the value of the counter i is not equal to (N−1), then the exchange increments the value of the counter i with 1 in step S1506, and repeats the processing from step S1504.

If the value of the counter i is equal to (N−1) in step S1505, then the exchange determines a control command for increasing uplink transmission power in step S1507.

If the difference (Di−Ti) is greater than 0 in step S1504, then the exchange determines a control command for reducing uplink transmission power in step S1508.

Thereafter, the exchange sends the determined control command for uplink transmission power to each of main and auxiliary base stations in step S1509.

Each of the base stations sends the control command for uplink transmission power from the exchange via the downlink to a mobile station, which then controls uplink transmission power according to the supplied control command.

According to the process shown in FIG. 4, since the same control command for uplink transmission power is transmitted from the main and auxiliary base stations, insofar as the mobile station successfully receives at least one control command, even if it fails to receive other control commands, the base station can control uplink transmission power to achieve required desired power without imposing excessive interference power on any other base stations.

As a consequence, the uplink capacity can be increased.

FIG. 5 of the accompanying drawings is a flowchart of a process for an exchange to receive a temporary control command indicated by a base station, determine a control command for uplink transmission power, and send the determined control command to the base station.

As shown in FIG. 5, an exchange receives a temporary control command from each of respective base stations with respect to each mobile station in step S1601.

If at least one of the received temporary control commands is for reducing transmission power in step S1602, then the exchange determines a control command for reducing uplink transmission power in step S1603. If all the received temporary control commands are for increasing transmission power in step S1602, then the exchange determines a control command for increasing uplink transmission power in step S1604.

Thereafter, the exchange sends the determined control command for uplink transmission power to each of the main and auxiliary base stations in step S1605.

Each of the base stations sends the control command for uplink transmission power from the exchange via the downlink to a mobile station, which then controls uplink transmission power according to the supplied control command.

According to the process shown in FIG. 5, since the same control command for uplink transmission power is transmitted from the main and auxiliary base stations, insofar as the mobile station successfully receives at least one control command, even if it fails to receive other control commands, the base station can control excessive interference power on any base stations.

As a consequence, the uplink capacity can be increased.

FIG. 6 of the accompanying drawings is a flowchart of a process for a base station to determine whether or not a base station is to transmit a signal while a soft handoff function is being performed.

As shown in FIG. 6, a base station receives reception power Q of pilot signals of main and auxiliary base stations from a mobile station in step S1701.

The base station regards the reception power of a pilot signal of its own station, reported from the mobile station, as Q0, in step S1702, and also regards the reception power of pilot signals of other base stations, reported from the mobile station, as Qi (i=1−N−1 where N is the sum of the number of main base stations and the number of auxiliary base stations) in step S1703.

Then, the base station sets a counter i to 1 in step S1704, and sets the maximum level Qmax for the reception power of pilot signals to 0 in step S1705.

If the reception power Qi of pilot signals is greater than the maximum level Qmax in step S1706, then the base station sets the maximum level Qmax to Qi in step S1707. The base station compares the counter i with (N−1). If the counter i is not equal to (N−1) in step S1708, then the base station increments the counter i by 1 in step S1709. Then, control repeats the processing from step S1706.

If the reception power Qi is equal or smaller than the maximum level Qmax in step S1706, then control jumps to step S1708.

If the counter i is equal to (N−1) in step S1708, then control goes to step S1710 in which the base station compares the maximum level Qmax with the reception power Q0 of the pilot signal of its own station. If the reception power Q0 is equal to or greater than the maximum level Qmax, then its own base station transmits a downlink signal in step S1711.

If the reception power Q0 is smaller than the maximum level Qmax in step S1710, other base stations transmit a downlink signal, but its own base station does not transmit a downlink signal.

As described above, while a soft handoff function is being performed, each base station receives reception power Q of all pilot signals of main and auxiliary base stations from a mobile station. If the reception power Q0 of the pilot signal of its own station is maximum, then the base station transmits a control command for uplink transmission power from an exchange via the downlink to the mobile station, and the mobile station controls uplink transmission power according to the transmitted control command for uplink transmission power.

According to the above transmission power control process, it is possible to control uplink transmission power to achieve required desired power without imposing excessive interference power on any base stations even in a cellular system in which only one of main and auxiliary base stations transmits a downlink signal based on the reception power Q of the pilot signal in the mobile station.

As a consequence, the uplink capacity can be increased.

In the conventional cellular system described above, unless downlink transmission power is adequately controlled, a mobile station is unable to properly receive a control command for controlling transmission power, which is transmitted from a base station via the downlink, resulting in excessive uplink desired power and increased interference power.

In cases where a mobile station controls transmission power based on a control command whose reception quality is good while ignoring a control command whose reception quality is poor, control commands may successively be judged as suffering poor reception quality depending on the criterion established for determining the reception quality, and the mobile station may be prevented from controlling transmission power, causing the same problems as described above.

In the process for increasing transmission power from a base station when a control command for reducing transmission power is transmitted from the base station to a mobile station while a soft handoff function is being performed, there may be occasions where the mobile station receives the control command with good quality even though the transmission power from the base station is not increased. In those occasions, since the control command is transmitted from the base station with more transmission power than required, downlink interference power is increased.

In the process for ignoring a control command whose reception quality is poor while a soft handoff function is being performed, the probability that a control command transmitted from a base station whose downlink propagation loss is larger is ignored is higher than the probability that a control command transmitted from a base station whose downlink propagation loss is smaller is ignored. If this process is applied to a cellular system where different frequencies are employed for uplink and downlink transmissions, then a certain base station may have a smaller uplink propagation loss than other base stations and receive excessive desired power because instantaneous uplink and downlink level variations differ from each other. In this case, even though a control command for reducing transmission power is continuously transmitted from the base station, if the base station has a larger downlink propagation loss than other base stations, then the control command transmitted from the base station to a mobile station is continuously ignored, and transmission power in the mobile station is controlled according to a control command transmitted from another base station whose uplink propagation loss is greater. In the base station whose uplink propagation loss is smaller, desired power remains excessive, and uplink interference power is increased. Particularly if the mobile station moves at a low speed and hence undergoes slow instantaneous level variations, the increased interference power remains continuously.

Even if the above process of ignoring certain control commands is not employed, control commands whose reception quality is poor may fail to be received or may be judged in error.

SUMMARY OF THE INVENTION

It is therefore an object of the present invention to provide a method of controlling transmission power in a cellular system to prevent signals from being transmitted from a mobile station to a base station with excessive transmission power for thereby increasing uplink capacity, and a base station apparatus for use in such a base station.

If, in a mobile station which has a link established with a base station, transmission power has been controlled on the basis of a first control command transmitted from the base station, then the reception quality of a signal transmitted from the mobile station, which is measured in the base station, is of a level close to target reception quality. If, in the mobile station, transmission power has been controlled on the basis of a first control command transmitted from a plurality of base stations, then the reception quality of a signal transmitted from the mobile station, which is measured in the base station, is of a level close to target reception quality or a level smaller than target reception quality.

According to the present invention, the reception quality of a signal transmitted from a mobile station is compared with target reception quality, and an increment for transmission power which is determined according to another algorithm is determined on the basis of a compared result. A control command is transmitted with transmission power which has been increased by the increment from the transmission power according to the other algorithm. If the increment determined according to the other algorithm is reduced, then the transmission power with which to transmit the control command is returned to the transmission power according to the other algorithm, thus lowering the probability that the mobile station fails to receive a control command for reducing transmission power. Therefore, the advantage of the other algorithm for transmission power control can also be attained.

With the above arrangement of the present invention, the reception quality of a signal transmitted from a mobile station is compared with target reception quality, and an increment for transmission power of a base station is determined on the basis of a compared result. The increment is added to the transmission power of the base station based on a second control command transmitted from the mobile station, and a first control command for controlling transmission power of the mobile station is transmitted with the transmission power with the increment added thereto. If the reception quality of the signal transmitted from the mobile station increases in excess of a predetermined range of target reception quality, then the increment for the transmission power is increased. If the reception quality of the signal transmitted from the mobile station falls within or becomes smaller than the predetermined range of target reception quality, then the increment for the transmission power is reduced. When the reception quality of the signal transmitted from the mobile station thus becomes close to or smaller than the target reception quality, the transmission power of the base station is returned to transmission power determined according to another algorithm.

While the transmission power is being controlled according to the an other algorithm, the probability that the mobile station will fail to receive a control command for reducing transmission power is lowered, and interference power is prevented from increasing.

The above and other objects, features and advantages of the present invention will become apparent from the following description with reference to the accompanying drawings which illustrate examples of the present invention.

DETAILED DESCRIPTION OF THE PREFERRED EMBODIMENTS

1st Embodiment

Figure 1:
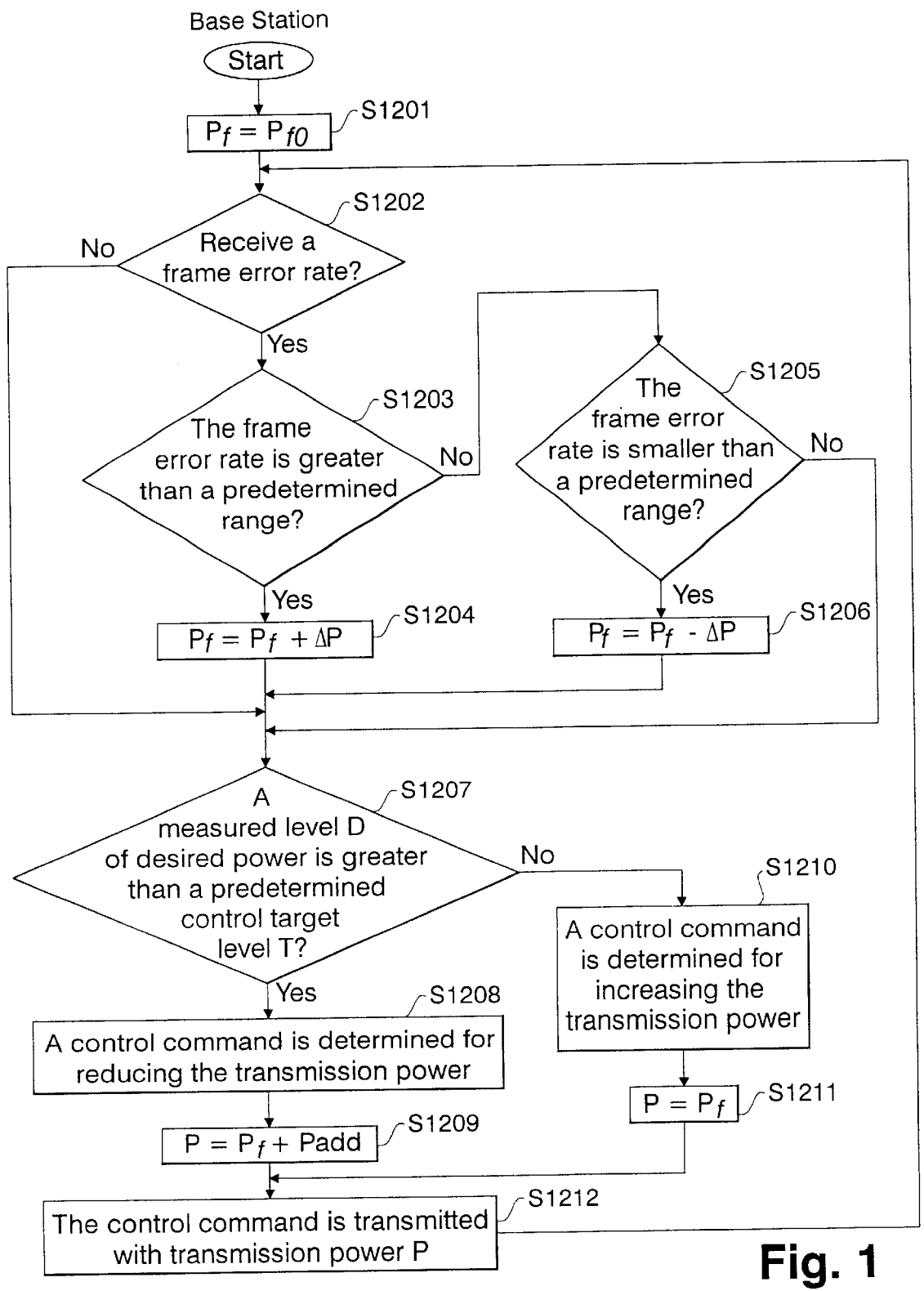
FIG. 1 is a flowchart of a process for a base station to receive a frame error rate reported from a mobile station, determine a downlink transmission power level, and transmit a control command for an uplink transmission power level.
Figure 2A:
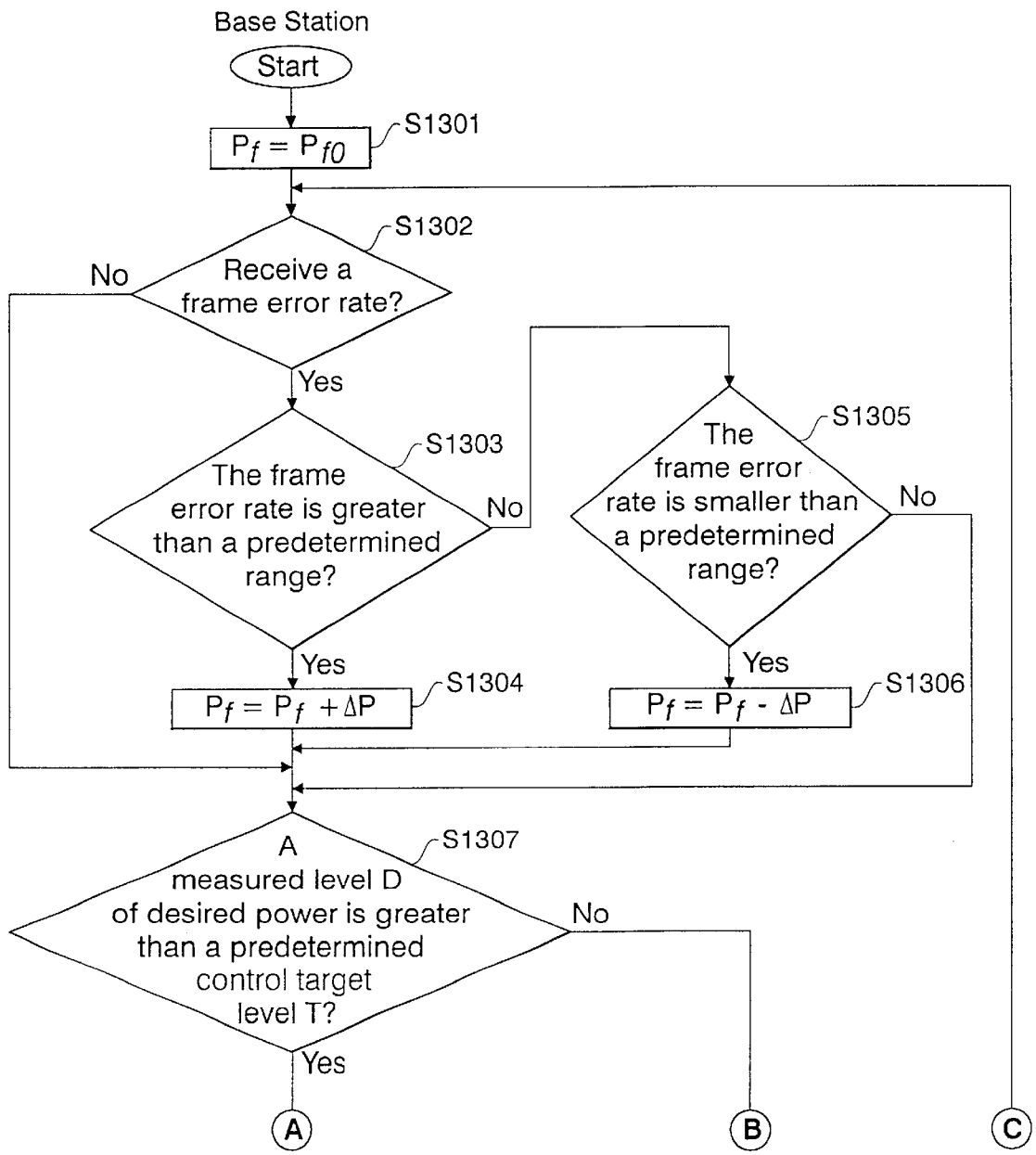
FIGS. 2A and 2B bridged by connectors A, B and C illustrate a flowchart of a process for a base station to receive the reception power Q of a pilot signal, measured in each frame, reported from a mobile station, determine a downlink transmission power level, and transmit a control command for an uplink transmission power level.
Figure 2B:
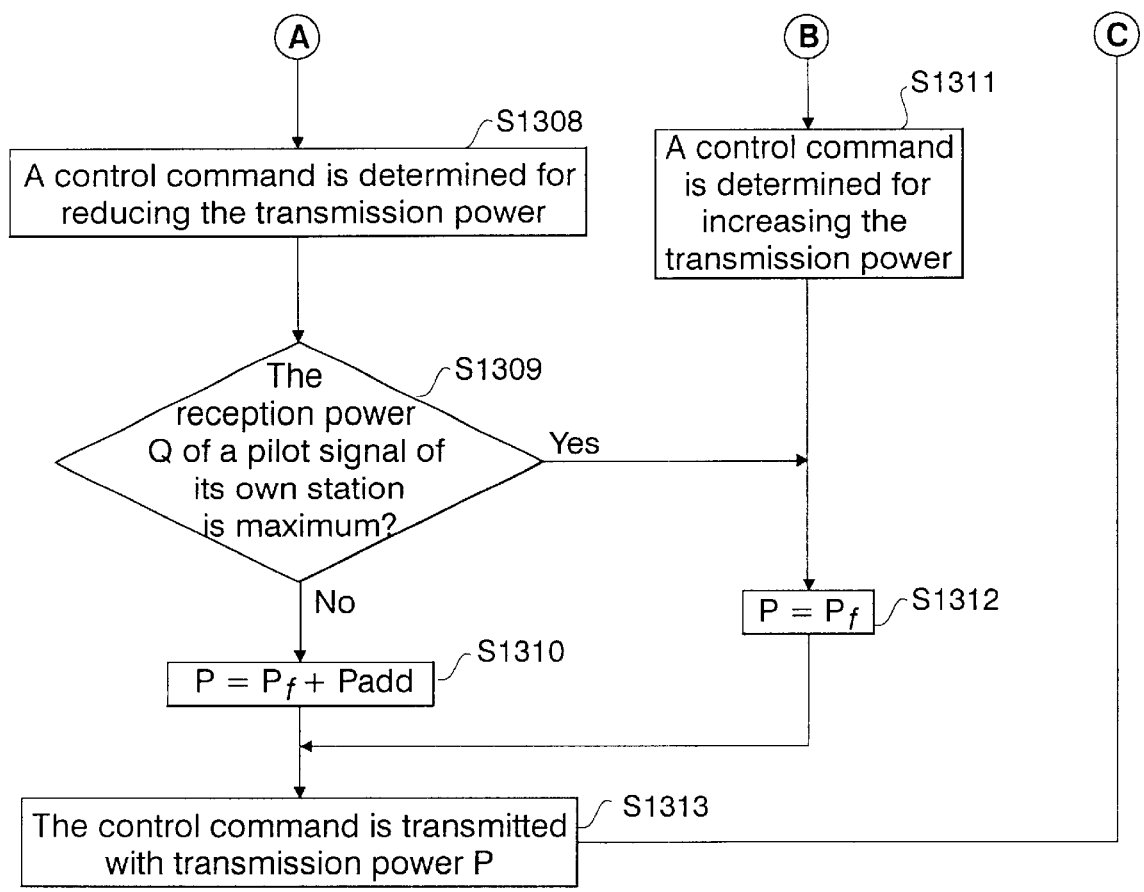
Figure 3:
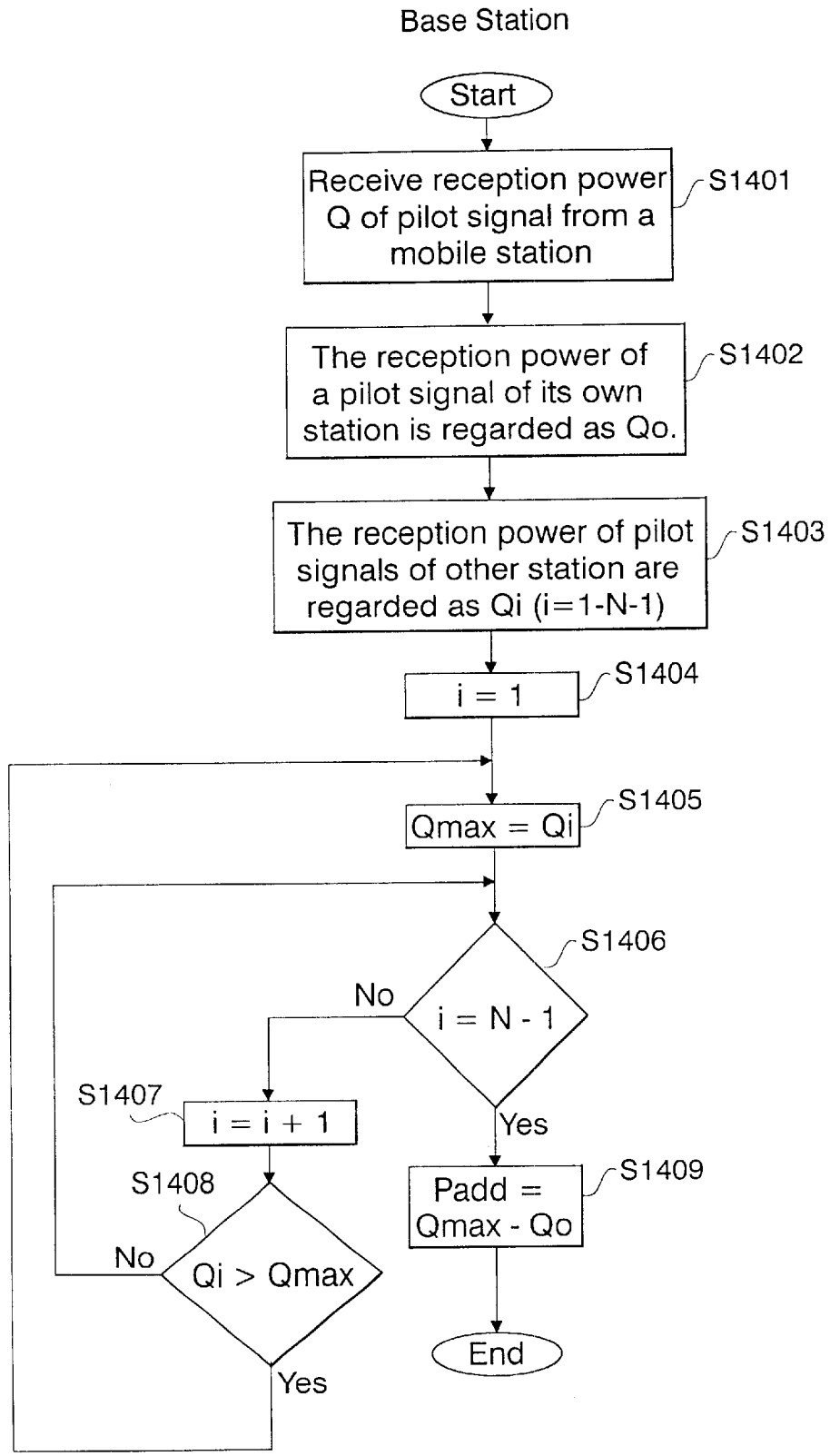
FIG. 3 is a flowchart of a process of determining a transmission power increment Padd in a conventional transmission power control process.
Figure 4:
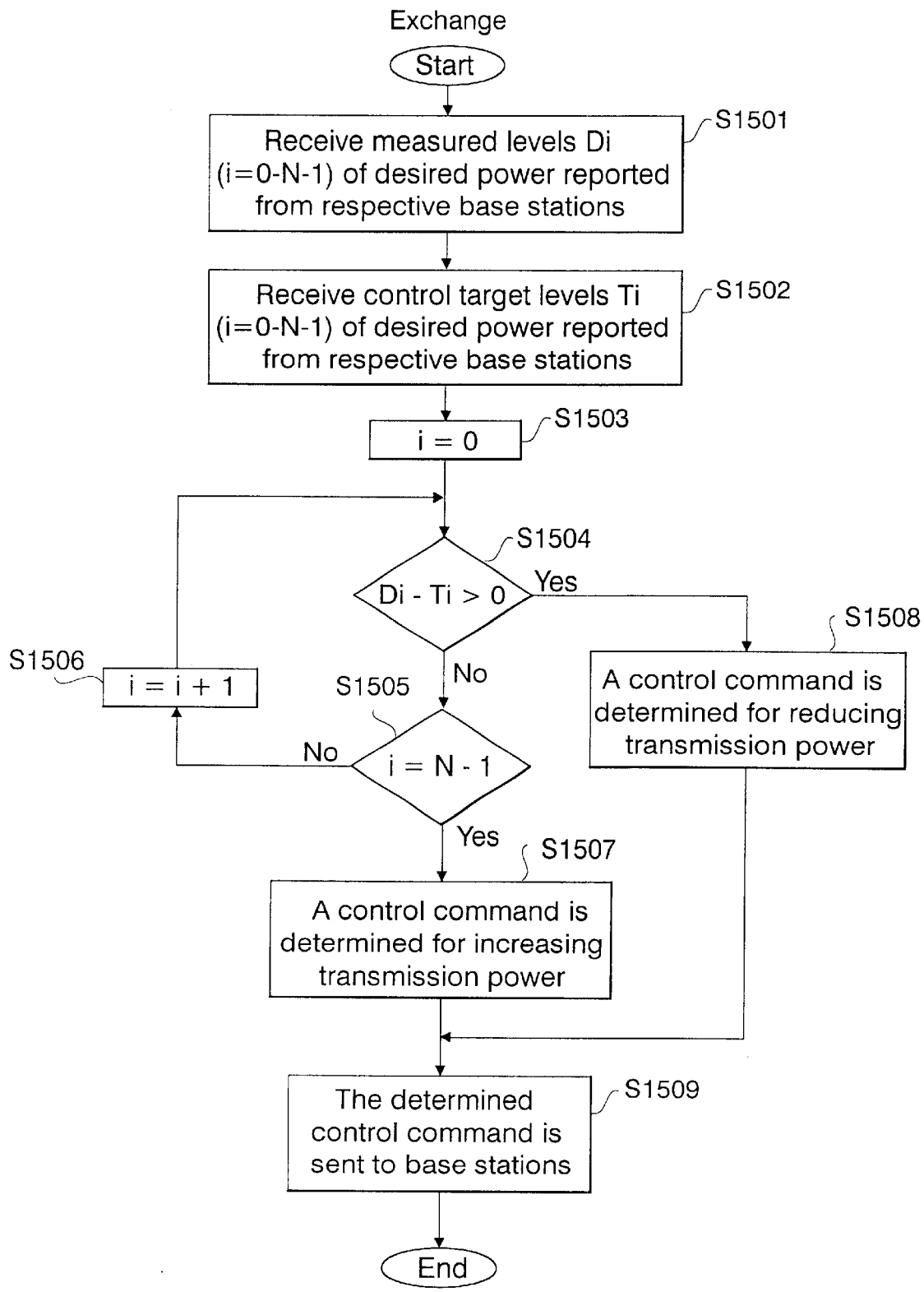
FIG. 4 is a flowchart of a process for an exchange to receive a measured level D of desired power which is indicated, determine a control command for uplink transmission power, and send the determined control command to a base station.
Figure 5:
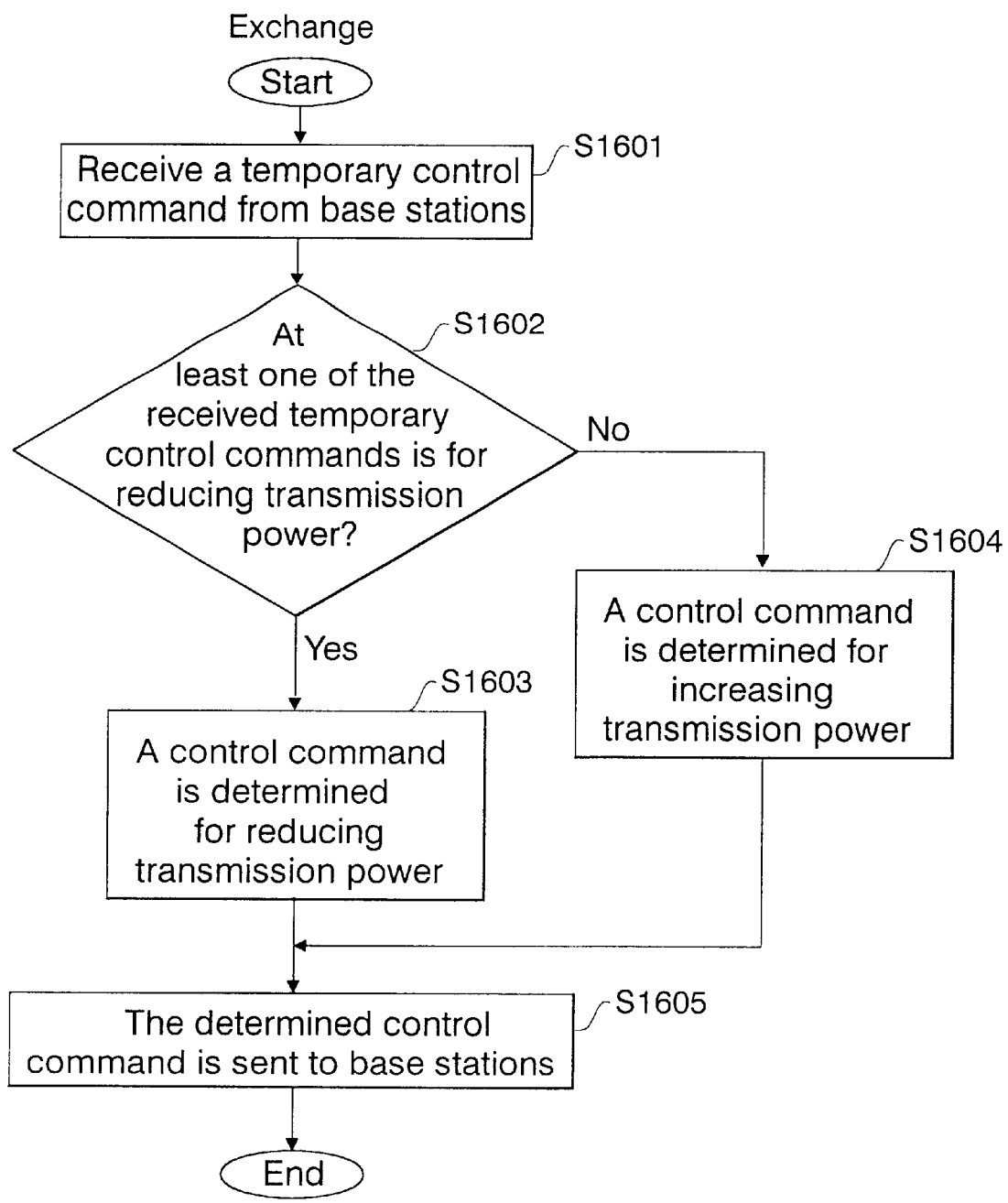
FIG. 5 is a flowchart of a process for an exchange to receive a temporary control command indicated by a base station, determine a control command for uplink transmission power, and send the determined control command to the base station.
Figure 6:
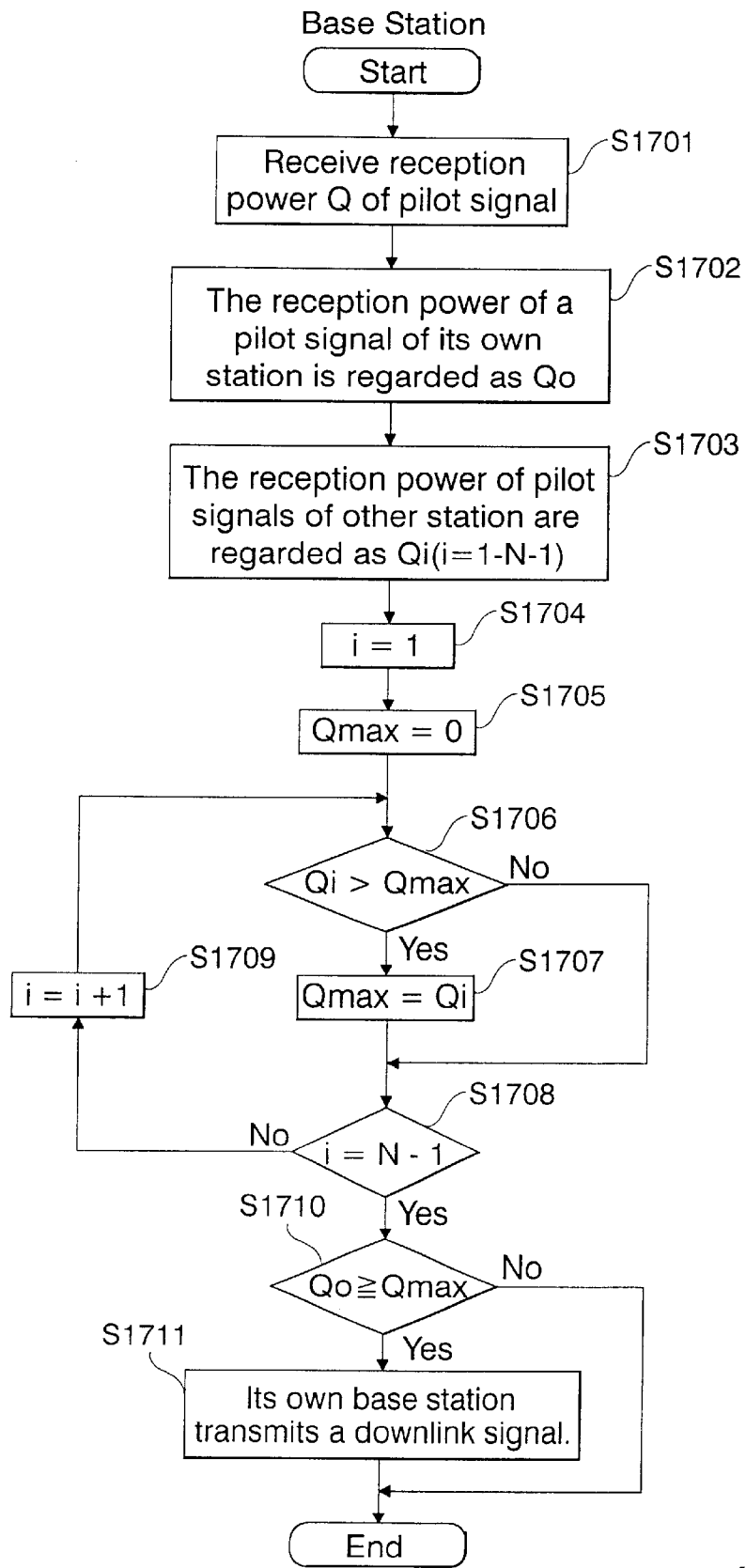
FIG. 6 is a flowchart of a process for a base station to determine whether or not a base station is to transmit a signal while a soft handoff function is being performed.
Figure 7:
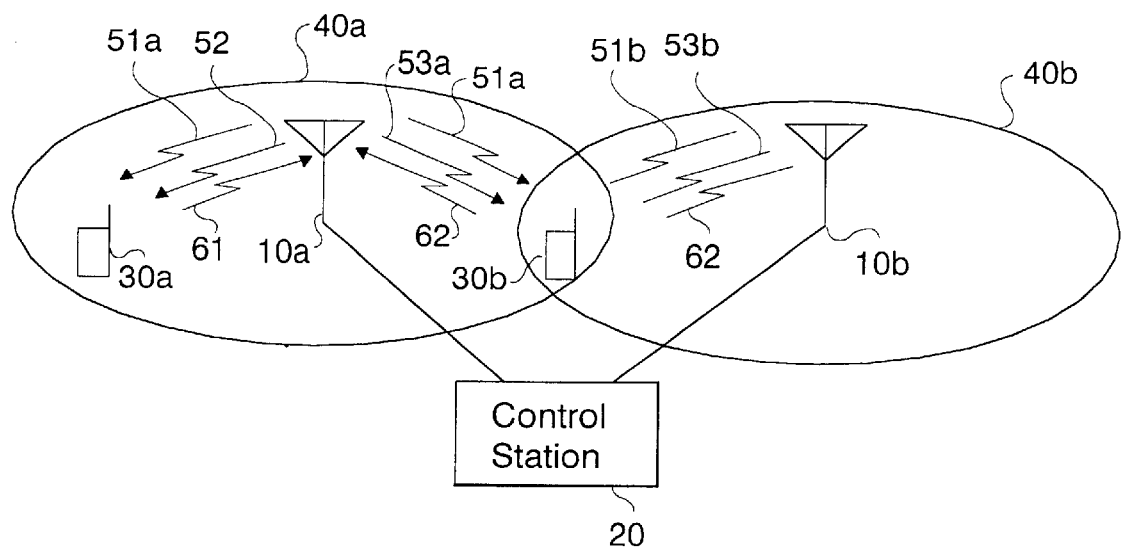
FIG. 7 is a schematic view of a cellular system which incorporates a method of controlling transmission power according to the present invention.

FIG. 7 schematically shows a cellular system which incorporates a method of controlling transmission power according to the present invention.

As shown in FIG. 7, the cellular system has a service area divided into a plurality of cells 40a, 40b which are covered respectively by base stations 10a, 10b. A mobile station 30a is present in the cell 40a, and another mobile station 30b is present in an overlap between the cells 40a, 40b. The base stations 10a, 10b are connected to a control station 20 which is positioned outside of the service area. The control station 20 is connected to a communication network (not shown) which comprises other control stations.

In FIG. 7, only the two base stations 10a, 10b, the two cells 20a, 20b covered respectively by the base stations 10a, 10b, and the two mobile stations 30a, 30b are illustrated. Actually, the cellular system has a number of base stations, with a number of mobile stations being present in each of the cells.

In the cellular system, different frequency carriers are assigned to uplinks where signals are transmitted from the mobile stations 30a, 30b and received by the base stations 10a, 10b and downlinks where signals are transmitted from the base stations 10a, 10b and received by the mobile stations 30a, 30b. Therefore, the base stations 10a, 10b and the mobile stations 30a, 30b communicate bidirectionally with each other.

The base stations 10a, 10b transmit perch channel signals 51a, 51b, respectively, with constant transmission power. The mobile stations 30a, 30b have measuring units (not shown) for measuring power of the perch channel signals 51a, 51b, and hence measure reception power of the perch channel signals 51a, 51b.

Figure 8:
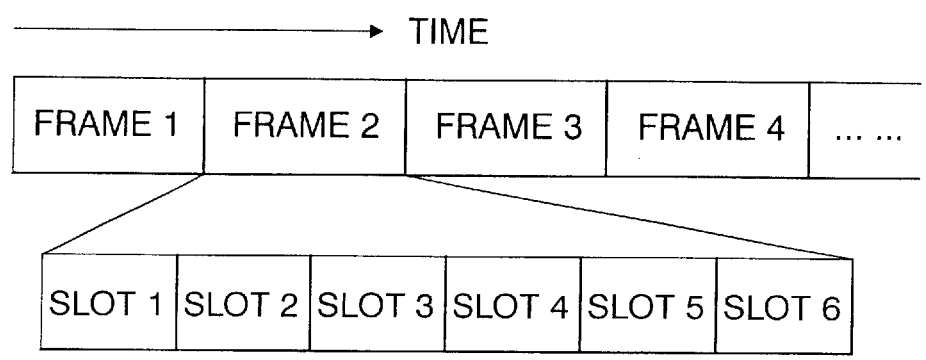
FIG. 8 is a diagram illustrative of a process of measuring reception power of a perch channel signal in a mobile station shown in FIG. 7.

FIG. 8 is illustrative of a process of measuring reception power of a perch channel signal in each of the mobile stations 30a, 30b shown in FIG. 7.

In each of the mobile stations 30a, 30b, the measuring unit is switched for every short time slot to measure reception power of perch channel signals from a plurality of base stations in each frame. In the example shown in FIG. 8, since there are six slots in each frame, the measuring unit is capable of measuring reception power of perch channel signals from six base stations in each frame.

When the mobile stations 30a, 30b move, an instantaneous level of the reception power at the mobile stations 30a, 30b varies in a short period as time passes. In order to measure reception power, it is necessary for the mobile stations 30a, 30b to determine a median level in each of the slots.

Figure 9:
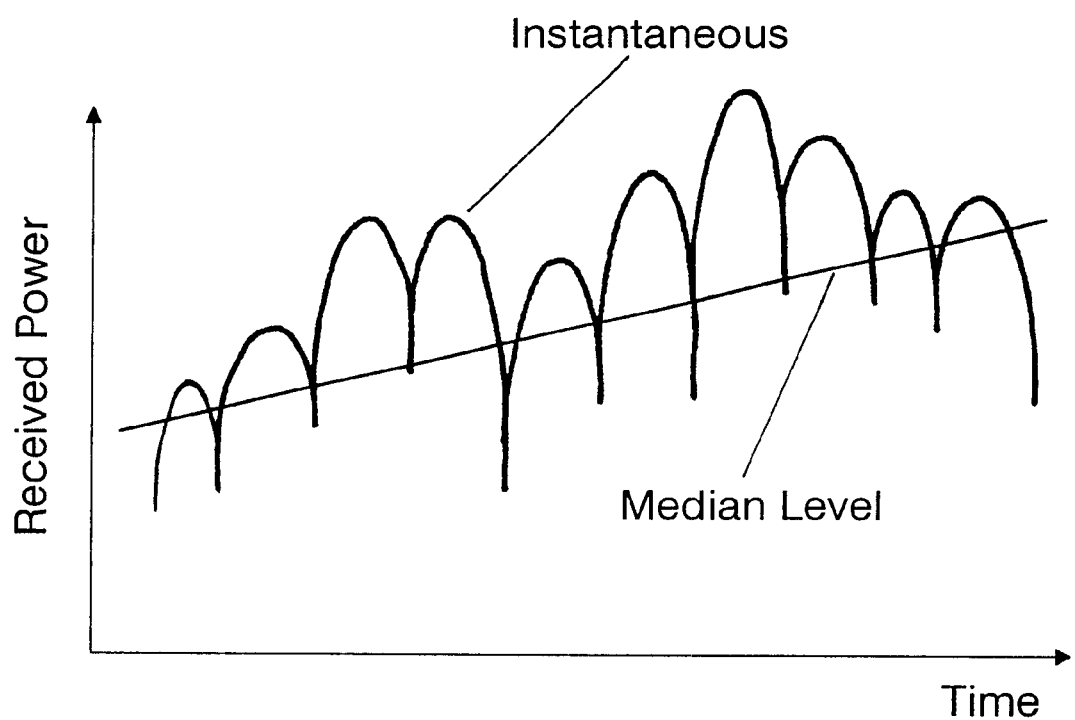
FIG. 9 is a diagram showing the relationship between instantaneous and median levels of the reception power when the mobile station shown in FIG. 7 moves.

FIG. 9 shows the relationship between instantaneous and median levels of the reception power when the mobile stations 30a, 30b shown in FIG. 7 move.

As shown in FIG. 9, the reception power is measured in a number of frames corresponding to a sufficiently long time with respect to the period of instantaneous level variations of the reception power at the time the mobile stations 10a, 10b move, and median levels of the measured reception power are determined in respective slots of each of the frames.

For actual communications in the cellular system, a link is established between a base station (hereinafter referred to as a main base station) with respect to which the median level of the reception power of the perch channel signals 51a, 51b is maximum and a mobile station, and then the mobile station and the main base station start to communicate with each other via the established link.

If there is a base station with respect to which the median level of the reception power of a perch channel signal received by a mobile station is greater than a level that is a predetermined handoff threshold smaller than the median level of the reception power of a perch channel signal from the main base station, then a link is also established between that base station (hereinafter referred to as an auxiliary base station) and the mobile station, and then the mobile station and the auxiliary base station start to communicate with each other via the established link.

During communications between the mobile and base stations, the reception power of the perch channel signal received by the mobile station may vary as the mobile station moves. If the base station with respect to which the median level of the reception power of a perch channel signal is maximum changes, or a base station no longer fulfill the auxiliary base station requirements, or another base station fulfills the auxiliary base station requirements, due to such variations in the reception power of the perch channel signal, then main and auxiliary base stations are updated.

In the mobile station 30b that is positioned in the overlap between the cells 40a, 40b, if it is assumed that the reception power of the perch channel signal 51a is maximum and the difference between the reception power of the perch channel signal 51b and the reception power of the perch channel signal 51a is equal to or smaller than a handoff threshold, then the base station 10a serves as a main base station, and the base station 10b as an auxiliary base station.

Downlink signals 53a, 53b are transmitted respectively from the base stations 10a, 10b to the mobile station 30b, and uplink signals 62 are transmitted from the mobile station 50b respectively to the base stations 10a, 10b.

In the mobile station 30a, since the reception power of the perch channel signal 51a transmitted from the base station 10a is maximum, the base station 10a serves as a main base station. It is assumed that the difference between the reception power of the perch channel signal 51a and the reception power of the perch channel signal 51b is greater than the handoff threshold, and there does not exist an auxiliary base station. At this time, the mobile station 30a communicates with the base station 10a using a downlink signal 52 and an uplink signal 61.

Figure 10A:
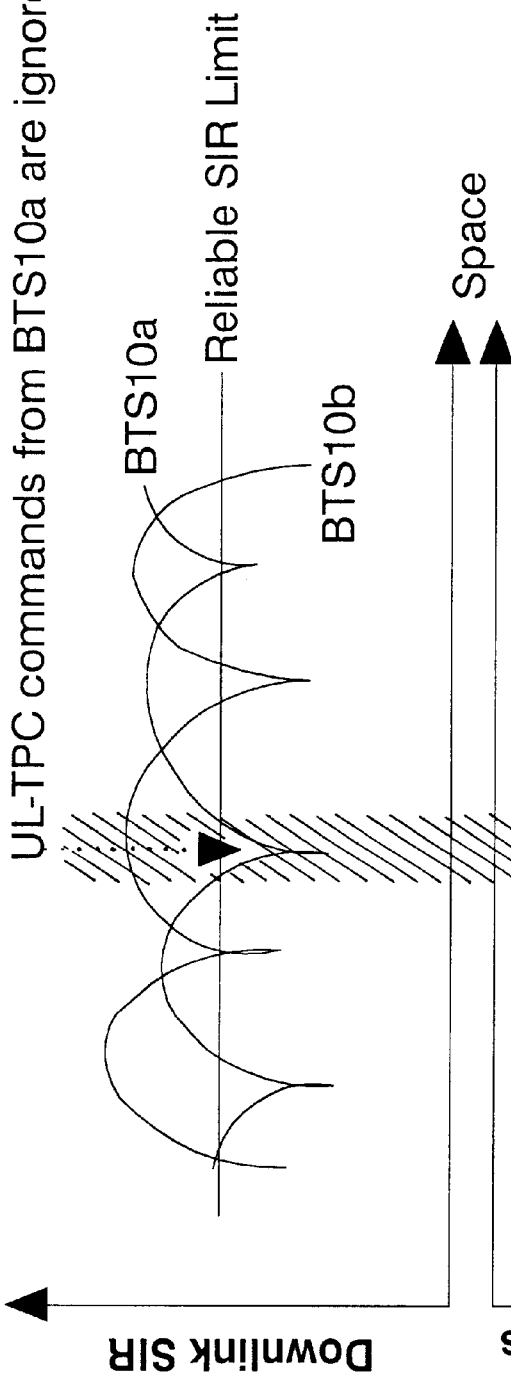
FIG. 10a is a diagram showing downlink SIRs from base stations 10a, 10b in a mobile station 10b shown in FIG. 7.
Figure 10B:
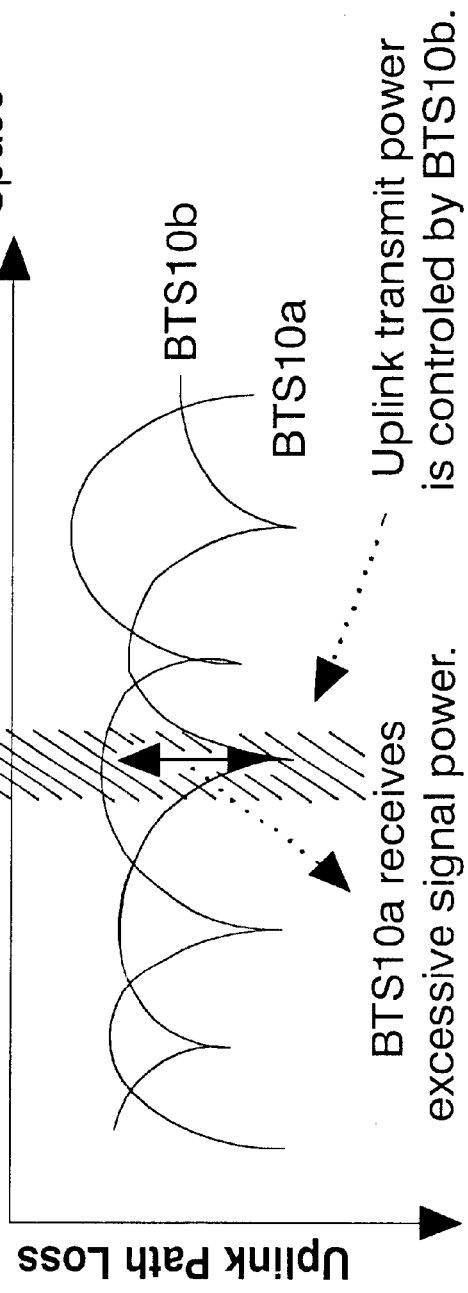
FIG. 10b is a diagram showing uplink propagation losses between the mobile station 10b and the base stations 10a, 10b shown in FIG. 7.

FIG. 10a show downlink SIRs from the base stations 10a, 10b in the mobile station 10b shown in FIG. 7, and FIG. 10b shows uplink propagation losses between the mobile station 10b and the base stations 10a, 10b shown in FIG. 7.

From the mobile station 30b to the base stations 10a, 10b, there is transmitted a command for controlling downlink transmission power using the uplink signals 62. From the base stations 10a, 10b to the mobile station 30b, there is transmitted a signal for controlling uplink transmission power using the downlink signals 53a, 53b.

As shown in FIG. 10a, if the signal transmitted from the base station 10a for controlling uplink transmission power is smaller than a downlink SIR threshold, then the signal transmitted from the base station 10a for controlling uplink transmission power is ignored. In this case, as shown in FIG. 10b, if the uplink propagation loss between the mobile station 30b and the base station 10a is small, the base station 10a receives the signal with excessive power, and the uplink propagation loss between the mobile station 30b and the base station 10b is greater than the propagation loss between the mobile station 30b and the base station 10a, then the uplink transmission power is controlled by the base station 10b.

The base stations 10a, 10b will be described in detail below.

Figure 11:
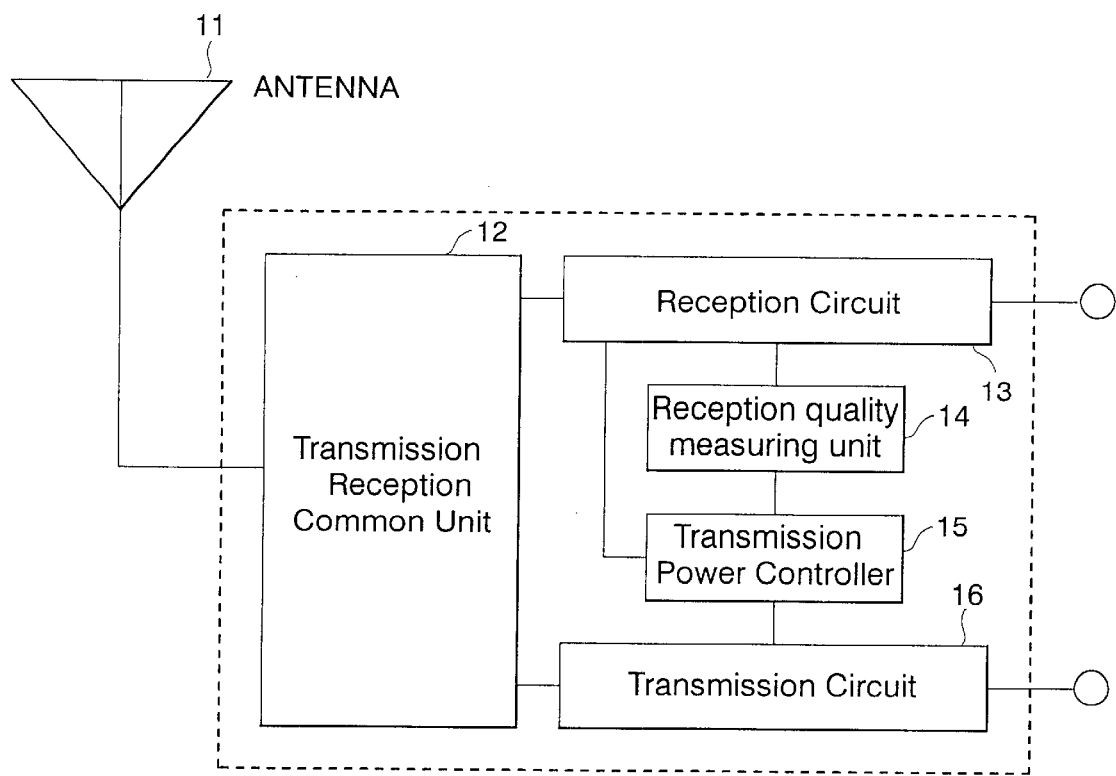
FIG. 11 is a block diagram of a base station shown in FIG. 7.

FIG. 11 shows in block form each of the base stations 10a, 10b illustrated in FIG. 7.

As shown in FIG. 11, each of the base stations 10a, 10b comprises an antenna 11 for transmitting and receiving radio waves, a reception circuit 13 for receiving signals transmitted from the mobile stations 30a, 30b via the antenna 11, a reception quality measuring unit 14 for measuring reception quality of signals received by the reception circuit 13 and comparing the measured reception quality with a target reception quality level, a transmission power controller 15 for determining a first control command for controlling transmission power of signals transmitted from the mobile stations 30a, 30b based on a compared result from the reception quality measuring unit 14, and determining a power level at which to transmit the first control command, based on a second control command from the mobile stations 30a, 30b which is received by the reception circuit 13 and the compared result from the reception quality measuring unit 14, and a transmission circuit 16 for transmitting the first control command via the antenna 11 to the mobile stations 30a, 30b with the power level determined by the transmission power controller 15. The antenna 11, the reception circuit 12, and the transmission circuit 16 are connected to each other by a transmission/reception common unit 12.

Each time a slot transmitted from the mobile stations 30a, 30b is received as indicating uplink reception quality, the reception quality measuring unit 14 measures a power ratio between desired power and interference power (hereinafter referred to as an SIR) and compares the measured SIR with a target SIR. The transmission power controller 15 determines a first control command for controlling transmission power of signals transmitted from the mobile stations 30a, 30b based on the compared result from the reception quality measuring unit 14, and also determines a power level at which to transmit the first control command, based on a second control command from the mobile stations 30a, 30b which is received by the reception circuit 13 and the compared result from the reception quality measuring unit 14.

If the compared result from the reception quality measuring unit 14 indicates that the measured SIR is smaller than the target SIR, then the transmission power controller 15 produces the first control command as a command for increasing power. If the compared result from the reception quality measuring unit 14 indicates that the measured SIR is greater than the target SIR, then the transmission power controller 15 produces the first control command as a command for reducing power. The transmission power controller 15 transmits the first control command from the transmission circuit 16 to the mobile stations.

The mobile stations 30a, 30b have a measuring unit (not shown) for measuring a downlink SIR. Each time the mobile stations 30a, 30b receive a slot transmitted from the base stations 10a, 10b, the mobile stations 30a, 30b measure an SIR of the received slot.

The base station 10a, which is the main base station for the mobile station 30b under a soft handoff, and the base station 10b, which is the auxiliary base station for the mobile station 30b under a soft handoff, transmit the downlink signals 53a, 53b, respectively, which represent the same information except for control commands for transmission power, to the mobile station 30b.

The mobile station 30b has a unit (not shown) for combining and receiving the same signals transmitted from the base stations 10a, 10b. Using this unit, the mobile station 30b combines and receives the downlink signals 53a, 53b, and measures an SIR. If the measured SIR is smaller than a target SIR, then the mobile station 30b generates the second control command as a command for increasing power. If the measured SIR is greater than a target SIR, then the mobile station 30b generates the second control command as a command for reducing power. The mobile station 30b transmits the second control command to the base stations 10a, 10b. Similarly, the mobile station 30a transmits a second control command to the base station 10a.

The base stations 10a, 10b control the transmission power based on the second control commands transmitted from the mobile stations 30a, 30b.

The method of controlling transmission power according to the present invention in the cellular system which is constructed as described above will be described below.

Figure 12A:
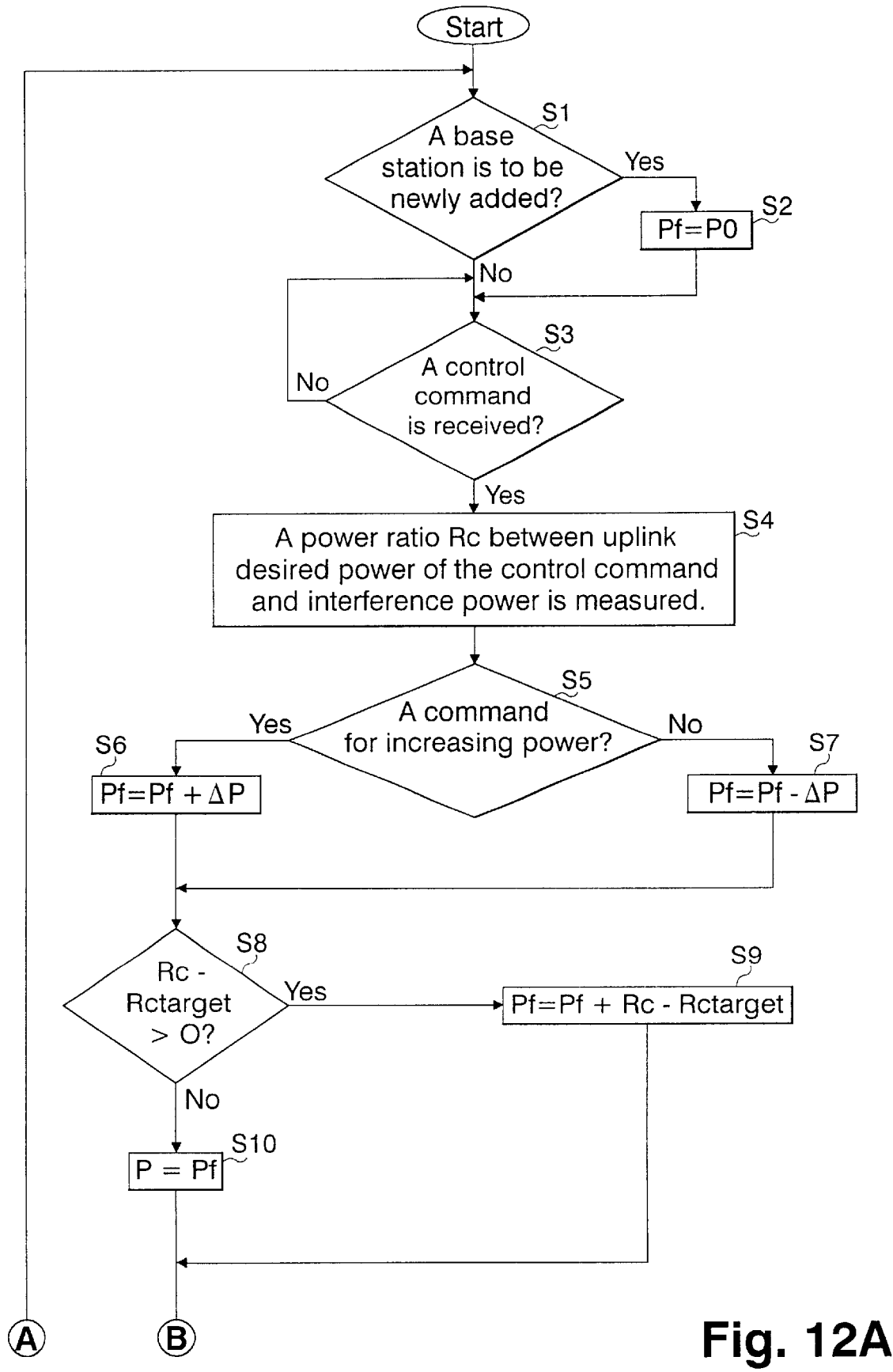
FIGS. 12A and 12B bridged by connectors A and B illustrate a flowchart of a processing sequence of the method of controlling transmission power according to the present invention in the cellular system shown in FIGS. 7 through 11.
Figure 12B:
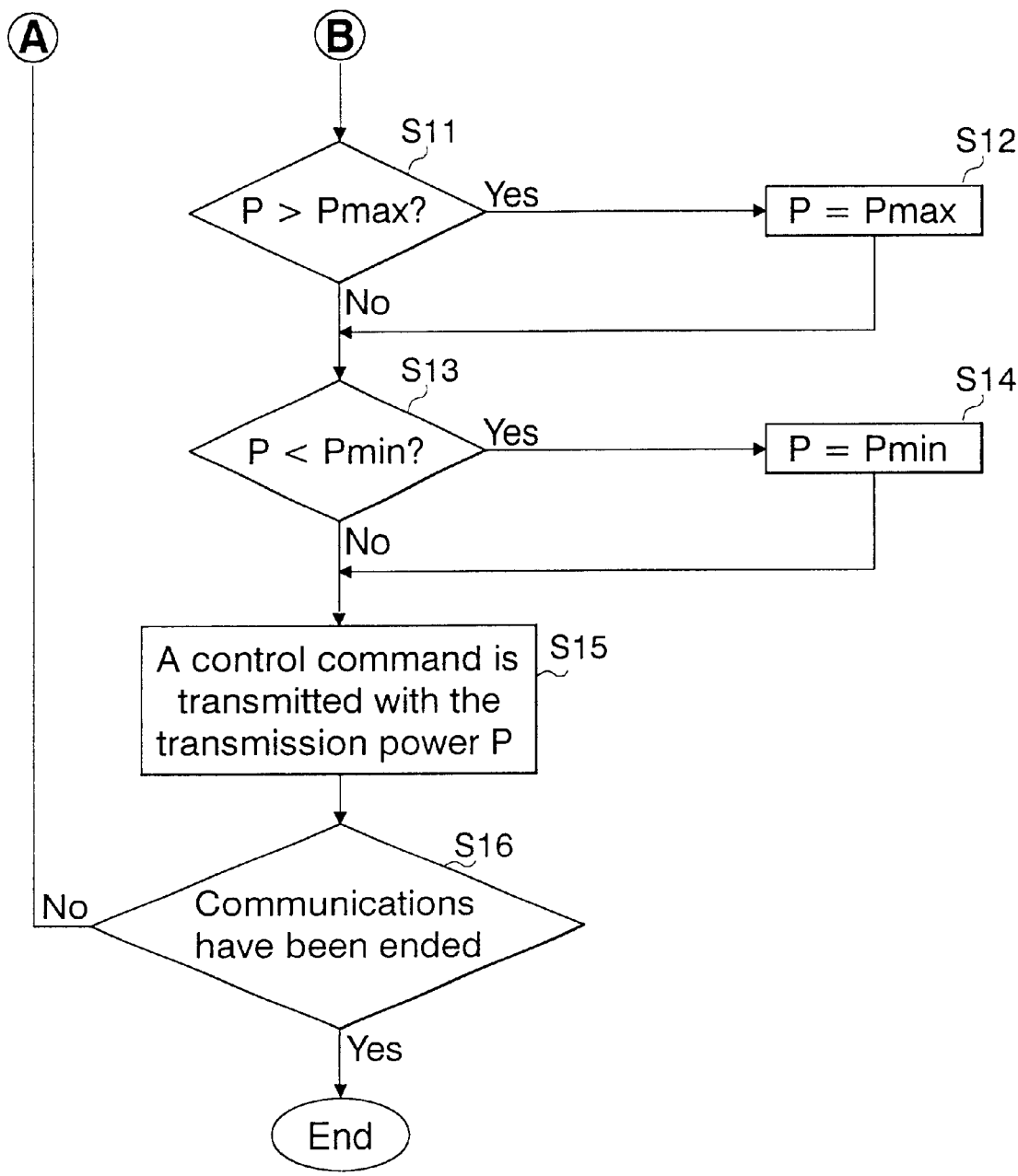

FIGS. 12A and 12B illustrate a flowchart of a processing sequence of the method of controlling transmission power according to the present invention in the cellular system shown in FIGS. 7 through 11. In this embodiment, a base station determines downlink transmission power, and transmits a control command for uplink transmission power with the determined downlink transmission power. Power is treated as a decibel value.

As shown in FIGS. 12A and 12B, the control station 20 decides whether a base station for transmitting a signal to a certain mobile station is to be newly added or not in step S1.

If a base station is to be newly added in step S1, then the control station 20 indicates the fact to all base stations, and downlink internal transmission power Pf is set to an initial level P0 in all the base stations in step S2.

If a base station and the mobile station start communicate with each other, then since the base station itself is newly added as a base station for newly transmitting a signal to the mobile station, the downlink internal transmission power Pf is set to the initial level P0.

If a base station is newly added, then the internal transmission power Pf is initialized in step S2 for the reason that all transmission power levels in main and auxiliary base stations will be equalized with each other. After the internal transmission power Pf is initialized simultaneously in all the base stations if a base station is newly added, the internal transmission power Pf is incremented or decremented in each of the base stations based on a control command transmitted from the same mobile station. Therefore, the internal transmission power Pf will remain equalized in all the base stations.

If no base station is newly added in step S1 or after step S2, then it is decided whether a control command for controlling downlink transmission power, transmitted from the mobile station, is being received by the base station or not in step S3. The control command for controlling downlink transmission power is transmitted at constant time intervals from the mobile station.

If the control command transmitted from the mobile station is being received by the base station in step S3, then a power ratio Rc between uplink desired power of the control command and interference power is measured in step S4.

Based on the measured uplink desired vs. interference power ratio Rc in step S4, it is decided whether the control command is for increasing power or not in step S5. If the control command is for increasing power, then the internal transmission power Pf is incremented in step S6. If the control command is for reducing power., then the internal transmission power Pf is decremented in step S7.

Then, it is decided whether a value (Rc−Rctarget) produced by subtracting a control target level Rctarget from the uplink desired vs. interference power ratio Rc is greater than 0 or not in step S8. If the value (Rc−Rctarget) is greater than 0, then downlink transmission power P is set to the sum of the internal transmission power Pf and the value (Rc−Rctarget) in step S9. If the value (Rc−Rctarget) is not greater than 0, then downlink transmission power P is set to the internal transmission power Pf in step S10.

Thereafter, it is decided whether the transmission power P is greater than a maximum level Pmax of transmission power or not in step S11. If the transmission power P is greater than the maximum level Pmax, then the transmission power P is set to the maximum level Pmax in step S12.

If the transmission power P is not greater than the maximum level Pmax in step S11, or after step S12, it is decided whether the transmission power P is smaller than a minimum level Pmin of transmission power or not in step S13. If the transmission power P is smaller than the minimum level Pmin, then the transmission power P is set to the minimum level Pmin in step S14.

If the transmission power P is not smaller than the minimum level Pmin in step S13, or after step S14, a transmission power command is transmitted with the transmission power P to the mobile station in step S15.

Thereafter, it is decided whether communications have been ended or not in step S16. If communications have been ended, then the processing sequence shown in FIG. 12 comes to an end. If communications have not been ended, then control returns to step S1.

In the mobile station 30a, the transmission power is controlled on the basis of a control command that is transmitted from the base station 10a with which a link has been established.

Because links are established between the mobile station 30b and the two base stations 10a, 10b, the mobile station 30b receives control commands transmitted respectively from the two base stations 10a, 10b. If these control commands differ from each other, then the mobile station 30b controls the transmission power based on the control command for reducing the transmission power.

According to the above method, a base station which is communicating with a mobile station under no soft handoff, e.g., the mobile station 30a, transmits a control command with greater transmission power via the downlink if the uplink desired vs. interference power ratio becomes greater than the target level. Therefore, the probability that the mobile station can receive the control command accurately is increased, suppressing an increase in the interference power due to excessive desired power received by the base station.

Similarly, a base station which is communicating with a mobile station under a soft handoff, e.g., the mobile station 30b, transmits a control command with greater transmission power via the downlink if desired power received by the base station is excessive. Consequently, the probability that the mobile station can receive the control command accurately is increased, suppressing an increase in the interference power.

2nd Embodiment

In a method of controlling transmission power in a cellular system according to a second embodiment of the present invention, a base station does not measure an SIR as an uplink reception quality, but measures desired power as an uplink reception quality. Other details of the method of controlling transmission power according to the second embodiment are identical to those of the method of controlling transmission power according to the first embodiment.

Each time a slot transmitted from a mobile station is received, the reception quality measuring unit 14 of each of the base stations 10a, 10b measures desired power Dc of the received slot as an uplink reception quality.

In step S4 shown in FIG. 12A, uplink desired power Rc is measured. In step S8 shown in FIG. 12A, it is decided whether a value (Rc−Rctarget) produced by subtracting a control target level Rctarget from the uplink desired power Rc is greater than 0 or not.

In step S9 shown in FIG. 12A, a value P=Pf+Rc−Rctarget is calculated.

Other details than described above are identical to those of the method of controlling transmission power according to the first embodiment. For the same reasons as described above with respect to the first embodiment, the method of controlling transmission power according to the second embodiment is capable of suppressing an increase in uplink interference power.

3rd Embodiment

A method of controlling transmission power in a cellular system according to a third embodiment of the present invention differs from the method of controlling transmission power according to the first embodiment only with respect to operation of a mobile station for controlling transmission power.

In the third embodiment, the mobile stations 30a, 30b have a measuring unit (not shown) for measuring a downlink SIR. Each time the mobile stations 30a, 30b receive a control command transmitted from a base station, they measure an SIR of the received control command.

If the SIR of a control command received by a mobile station under no soft handoff, e.g., the mobile station 30a, is smaller than a predetermined reference level, then the control command is ignored, and transmission power in the mobile station is set to a preceding level. If the SIR of a control command received by the mobile station is equal to or greater than the predetermined reference level, then transmission power in the mobile station is incremented or reduced on the basis of the control command.

A mobile station under a soft handoff, e.g., the mobile station 30b, receives control commands from respective base stations, and individually measures the SIRs of the received control commands. The mobile station ignores the control commands whose SIRs are less than a reference level. If at least one of the control commands whose SIRs are equal to or greater than the reference level is for reducing transmission power, then the mobile station reduces transmission power. If all of those control commands whose SIRs are equal to or greater than the reference level is for increasing transmission power, then the mobile station increases transmission power.

As is the case with the first embodiment, a base station which is communicating with a mobile station under no soft handoff, e.g., the mobile station 30a, transmits a control command with greater transmission power via the downlink if the uplink desired vs. interference power ratio becomes greater than the target level. Therefore, the probability that the mobile station can receive the control command accurately is increased, suppressing an increase in the interference power due to excessive desired power received by the base station.

Furthermore, a downlink propagation loss and an uplink propagation loss differ from each other due to different instantaneous level variations depending on the frequency even between the same base and mobile stations. In a mobile station under a soft handoff, e.g., the mobile station 30b, the downlink propagation loss may be greater for the base station 10a than for the base station 10b, and the uplink propagation loss may be smaller for the base station 10a than for the base station 10b.

Since the downlink SIR in the mobile station 30b is smaller than the reference level, the mobile station 30b ignores a control command transmitted from the base station 10a, and controls transmission power based on a control command transmitted from the base station 10b with respect to which the downlink SIR is equal to or greater than the reference level. Thus, even if the SIR of a signal transmitted from the mobile station 30b is of a target level in the base station 10b, the SIR of the signal transmitted from the mobile station 30b is of an excessive level greater than the target level in the base station 10a whose uplink propagation loss is smaller than that of the base station 10b.

In this case, according to the method described in the third embodiment, the base station 10a transmits a control command with downlink transmission power increased by a level that is commensurate with the increase in the uplink SIR with respect to its target level. Therefore, the probability that the SIR of the control command in the mobile station 30b is equal to or greater than the reference level is increased.

Consequently, since transmission power is reduced in the mobile station 30b on the basis of the control command transmitted from the base station 10b, the SIR of a signal transmitted from the mobile station 30b approaches a target level in the base station 10a.

In this manner, an increase in the interference power due to excessive desired power in the base station can be suppressed.

In the first through third embodiments, the control target level for uplink transmission power control does not need to be common to all the base stations, nor to be constant, but may be incremented or decremented depending on the interference power in each of the base stations.

4th Embodiment

A method of controlling transmission power and a base station apparatus according to a fourth embodiment are incorporated in the cellular system shown in FIG. 7.

Different frequency carriers are assigned to uplinks where signals are transmitted from the mobile stations and received by the base stations and downlinks where signals are transmitted from the base stations and received by the mobile stations. Therefore, the base stations and the mobile stations communicate bidirectionally with each other.

The base stations 10a, 10b transmit perch channel signals 51a, 51b, respectively, with constant transmission power. The mobile stations 30a, 30b measure reception power of the perch channel signals 51a, 51b.

For communications, a link is established between main and auxiliary base stations. In the mobile station 30b, the base station 10a serves as a main base station, and the base station 10b as an auxiliary base station. In the mobile station 30a, the base station 10a serves as a main base station.

The base station apparatus according to the fourth embodiment is identical to the structure shown in FIG. 11.

Each time a slot transmitted from a mobile station is received, the reception quality measuring unit 14 of each of the base stations 10a, 10b measures an SIR of the received slot as an uplink reception quality.

The mobile stations 30a, 30b have a measuring unit (not shown) for measuring a downlink SIR. Each time the mobile stations 30a, 30b receive a slot transmitted from the base stations, the mobile stations 30a, 30b measure an SIR of the received slot.

As with the first embodiment, the mobile station 30b determines a control command, and transmits the control command to the base stations 10a, 10b. The mobile station 30a also transmits a control command to the base station 10a.

The method of controlling transmission power according to the fourth embodiment will be described below with reference to a flowchart. In the flowchart and its description, power is treated as a decibel value.

In this embodiment, the sum of internal transmission power Pf determined by a control command transmitted from a mobile station and a transmission power increment Padd determined depending on an uplink desired vs. interference power ratio becomes downlink transmission power P in a base station. Then, a transmission power control command is transmitted with the transmission power P from the base station to the mobile station via the downlink.

Figure 13:
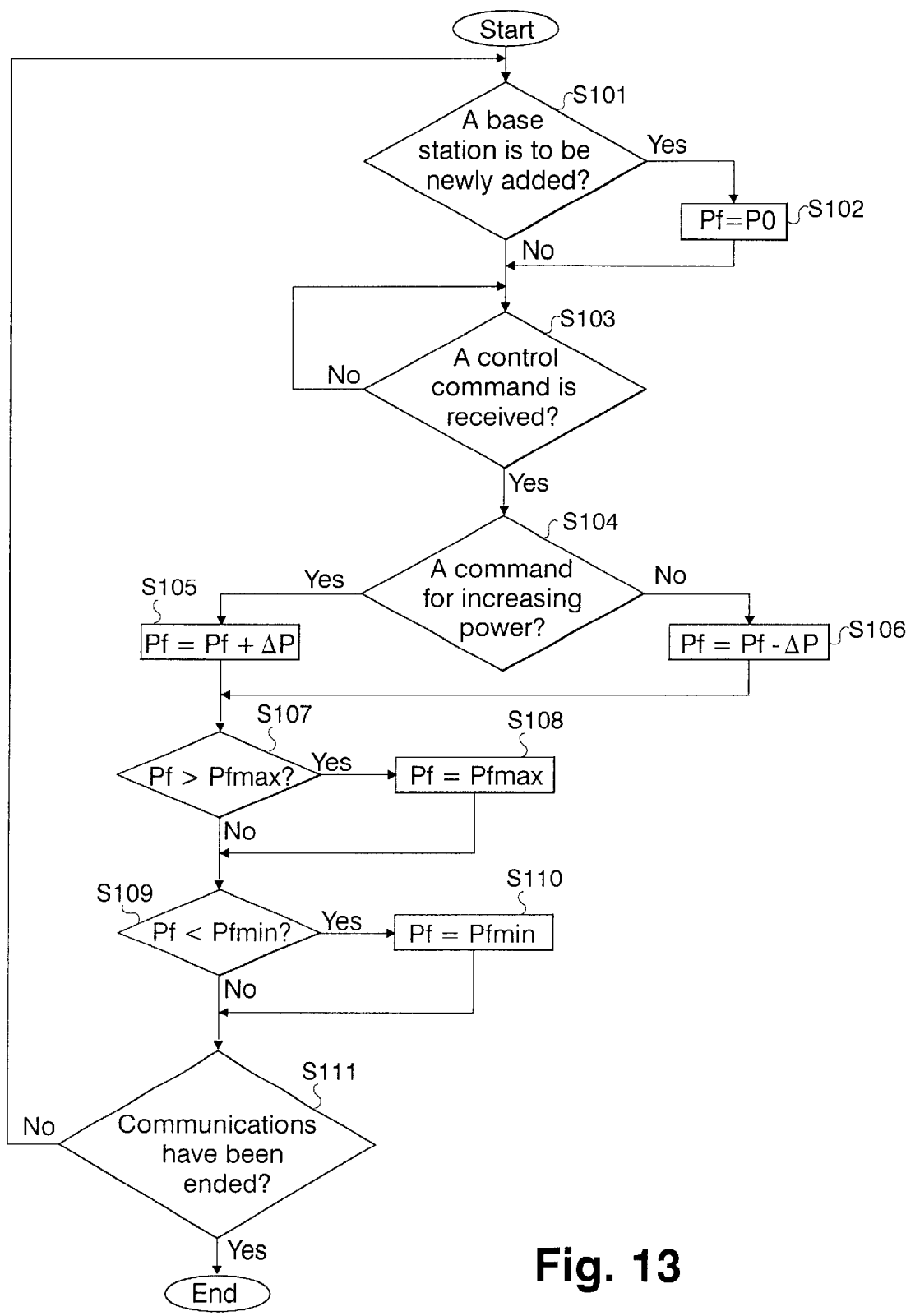
FIG. 13 is a flowchart of a process of determining internal transmission power in a base station according to the method of controlling transmission power in the cellular system shown in FIGS. 7 through 11.

FIG. 13 is a flowchart of a process of determining internal transmission power Pf in a base station according to the method of controlling transmission power in the cellular system shown in FIGS. 7 through 11.

As shown in FIG. 13, the control station 20 decides whether a base station for transmitting a signal to a certain mobile station is to be newly added or not in step S101.

If a base station is to be newly added in step S101, then the control station 20 indicates the fact to all base stations, and downlink internal transmission power Pf is set to an initial level P0 in all the base stations in step S102.

If a base station and the mobile station start communicate with each other, then since the base station itself is newly added as a base station for newly transmitting a signal to the mobile station, the downlink internal transmission power Pf is set to the initial level P0.

If no base station is newly added in step S101 or after step S102, then it is decided whether a control command for controlling downlink transmission power, transmitted from the mobile station, is being received by the base station or not in step S103. The control command for controlling downlink transmission power is transmitted at constant time intervals from the mobile station.

If a control command transmitted from the mobile station is being received in step S103, then it is decided whether the received control command is for increasing power or not in step S104. If the control command is for increasing power, then the internal transmission power Pf is incremented in step S105. If the control command is for reducing power, then the internal transmission power Pf is decremented in step S106.

It is then decided whether the internal transmission power Pf calculated in step S105 or S106 is greater than a maximum level Pmax of transmission power or not in step S107. If the transmission power P is greater than the maximum level Pmax, then the transmission power P is set to the maximum level Pmax in step S108.

If the transmission power P is not greater than the maximum level Pmax in step S107, or after step S108, it is decided whether the transmission power P is smaller than a minimum level Pmin of transmission power or not in step S109. If the transmission power P is smaller than the minimum level Pmin, then the transmission power P is set to the minimum level Pmin in step S110.

If the transmission power P is not smaller than the minimum level Pmin in step S109, or after step S110, it is decided whether communications have been ended or not in step S111. If communications have been ended, then the processing sequence shown in FIG. 13 comes to an end. If communications have not been ended, then control returns to step S101.

Figure 14:
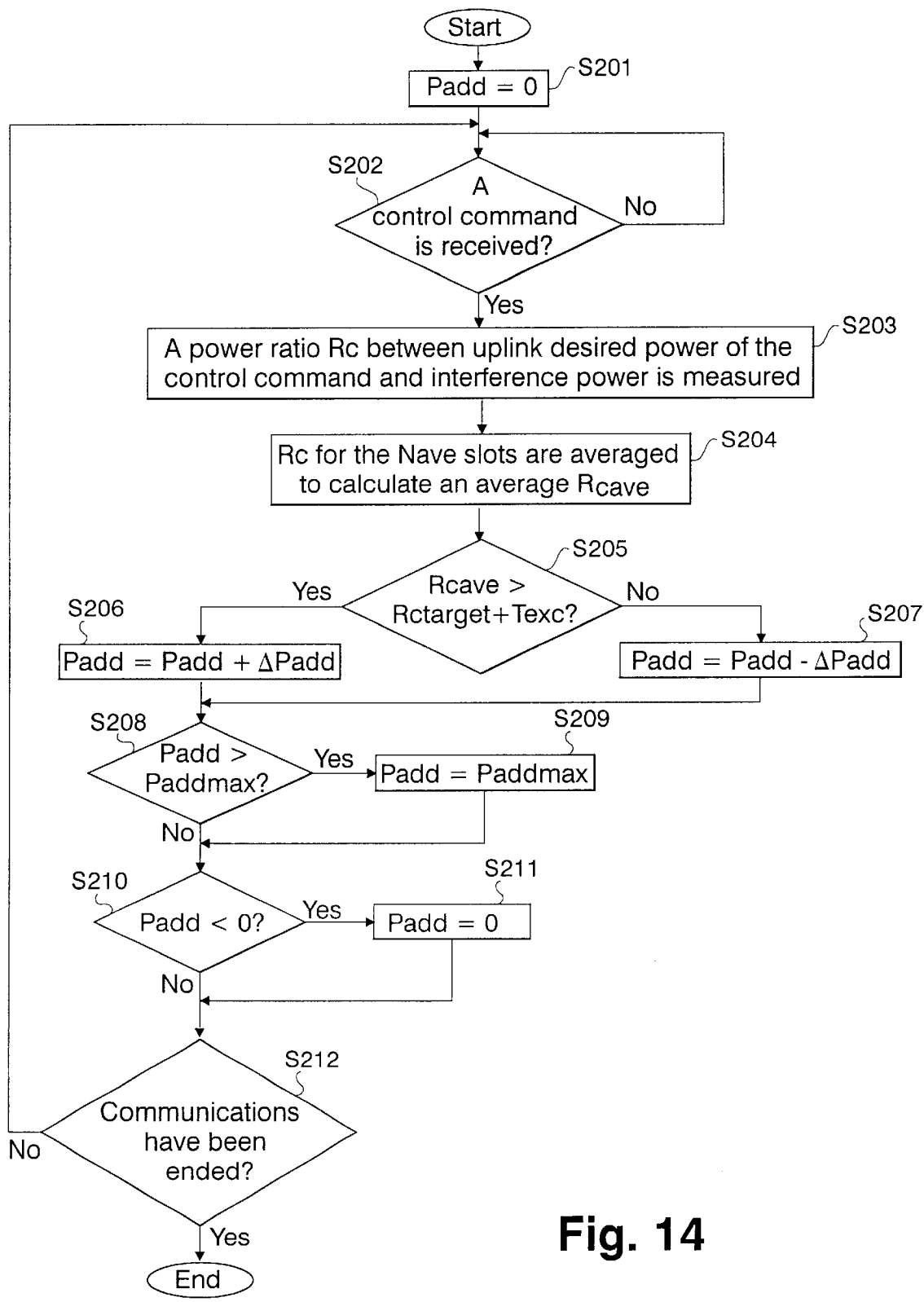
FIG. 14 is a flowchart of a process of determining a transmission power increment in a base station according to the method of controlling transmission power in the cellular system shown in FIGS. 7 through 11.

FIG. 14 is a flowchart of a process of determining a transmission power increment Padd in a base station according to the method of controlling transmission power in the cellular system shown in FIGS. 7 through 11.

When a base station and a mobile station start communicate with each other, the base station sets the transmission power increment Padd to an initial level 0 in step S201.

Then, it is decided whether a control command transmitted from the mobile station is being received in step S202. If a control command transmitted from the mobile station is being received, then a power ratio Rc between desired power of the control command and interference power is measured in step S203.

Since the base station determines an average of the power ratios Rc between desired power and interference power for Nave slots, the measured desired vs. interference power ratios Rc are held in a memory for a period of time corresponding to the Nave slots.

Then, the desired vs. interference power ratios Rc for the Nave slots are averaged to calculate an average desired vs. interference power ratio Rcave in step S204. Until the reception of the Nave slots is completed after the start of the communications, the average of the desired vs. interference power ratios Rc that are held in the memory is used as the average desired vs. interference power ratio Rcave.

Then, it is decided whether the average desired vs. interference power ratio Rcave is greater than the sum of the control target level Rctarget and Texc or not in step S205. If the average desired vs. interference power ratio Rcave is greater than the sum of the control target level Rctarget and Texc, then $\Delta$Padd is added to the transmission power increment Padd in step S206. If the average desired vs. interference power ratio Rcave is not greater than the sum of the control target level Rctarget and Texc, then $\Delta$Padd is subtracted from the transmission power increment Padd in step S207.

After step S206 or S207, it is decided whether the transmission power increment Padd is greater than a maximum level Paddmax thereof or not in step S208. If the transmission power increment Padd is greater than the maximum level Paddmax, then the transmission power increment Padd is set to the maximum level Paddmax in step S209.

If the transmission power increment Padd is not greater than the maximum level Paddmax in step S208, or after step S209, it is decided whether the transmission power increment Padd is smaller than 0 or not in step S210. If the transmission power increment Padd is smaller than 0, then the transmission power increment Padd is set to 0 in step S211.

If the transmission power increment Padd is not smaller than 0 in step S210, or after step S211, it is decided whether communications have been ended or not in step S212. If communications have been ended, then the processing sequence shown in FIG. 14 comes to an end. If communications have not been ended, then control returns to step S202.

Thereafter, transmission power determined on the basis of an SIR based on a closed-loop control process for a short period of time is added to the transmission power increment Padd determined by the processing shown in FIG. 14, and a signal is transmitted from the base station to the mobile station with the sum transmission power.

"Nave" represents a constant for preventing the transmission power increment Padd from increasing when the desired vs. interference power ratio Rc instantaneously increases, with the constant being 1 or more. "Texc" serves as a constant to prevent the transmission power increment Padd from increasing when the desired vs. interference power ratio Rc slightly increases due to a transmission power control error, the constant being 0 or more.

In the mobile station 30a, the transmission power is controlled on the basis of a control command that is transmitted from the base station 10a with which a link has been established. Because links are established between the mobile station 30b and the two base stations 10a, 10b, the mobile station 30b receives control commands transmitted respectively from the two base stations 10a, 10b. If these control commands differ from each other, then the mobile station 30b controls the transmission power based on the control command for reducing the transmission power.

According to the fourth embodiment, as is the case with the first embodiment, a base station which is communicating with a mobile station under no soft handoff, e.g., the mobile station 30a, transmits a control command with greater transmission power via if the uplink desired vs. interference power ratio becomes greater than the target level. Therefore, the probability that the mobile station can receive the control command accurately is increased, suppressing an increase in the interference power due to excessive desired power received by the base station.

Similarly, a base station which is communicating with a mobile station under a soft handoff, e.g., the mobile station 30b, transmits a control command with greater transmission power via the downlink if desired power received by the base station is excessive. Consequently, the probability that the mobile station can receive the control command accurately is increased, suppressing an increase in the interference power.

5th Embodiment

In a method of controlling transmission power in a cellular system according to a fifth embodiment of the present invention, a base station does not measure an SIR as an uplink reception quality, but measures desired power as an uplink reception quality. Other details of the method of controlling transmission power according to the fifth embodiment are identical to those of the method of controlling transmission power according to the fourth embodiment.

Each time a slot transmitted from a mobile station is received, the reception quality measuring unit 14 of each of the base stations 10a, 10b measures desired power Rc of the received slot as an uplink reception quality.

In step S203 shown in FIG. 14, uplink desired power Rc is measured. In step S204 shown in FIG. 14, an average Rcave of measured desired power levels Rc is calculated.

In step S205 shown in FIG. 14, it is decided whether Rcave. Rctarget+Texc where Rctarget is of a predetermined level.

Other details than described above are identical to those of the method of controlling transmission power according to the fourth embodiment. For the same reasons as described above with respect to the fourth embodiment, the method of controlling transmission power according to the fifth embodiment is capable of suppressing an increase in uplink interference power.

6th Embodiment

A method of controlling transmission power in a cellular system according to a sixth embodiment of the present invention is similar to the method of controlling transmission power according to the fourth embodiment except for the determination of a transmission power increment Padd dependent on an uplink desired vs. interference power ratio.

In the sixth embodiment, in the mobile station 30a having a link established with the single base station 10a, the transmission power increment Padd is always set to 0. In the mobile station 30b having links established with the base stations 10a, 10b, reception power of perch channel signals 51a, 51b transmitted from the base stations 10a, 10b is measured during communications, and when control commands are transmitted from the mobile station 30b to the base stations 10a, 10b, the identification number of a base station where the reception power of a perch channel signal is maximum, i.e., a base station where the downlink propagation loss is minimum, is transmitted, and the information of the identification number is used to increment or decrement the transmission power increment Padd in the mobile station 30b.

Figure 15:
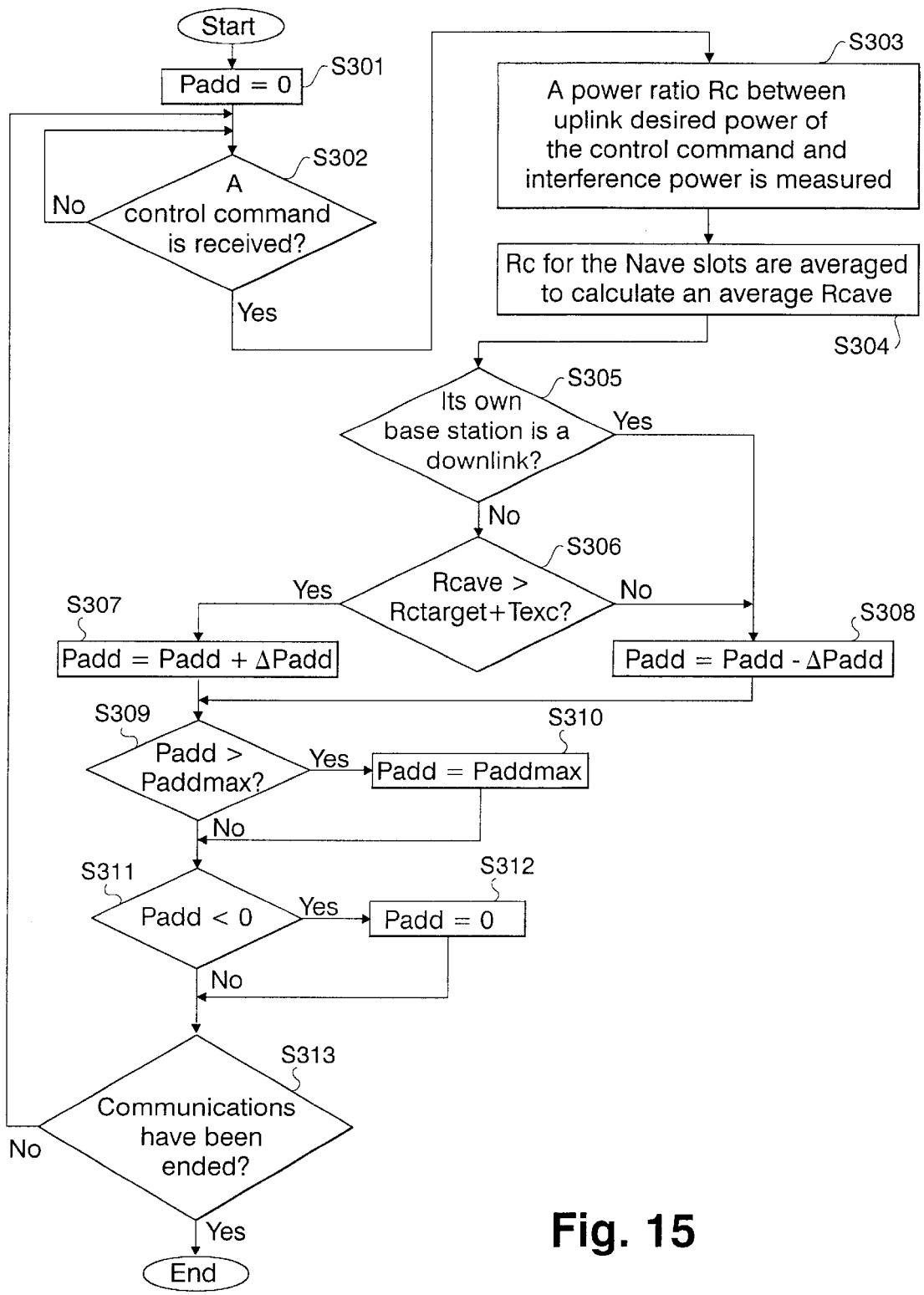
FIG. 15 is a flowchart of another process of determining a transmission power increment in a base station according to the method of controlling transmission power in the cellular system shown in FIGS. 7 through 11.

FIG. 15 is a flowchart of another process of determining a transmission power increment Padd in a base station according to the method of controlling transmission power in the cellular system shown in FIGS. 7 through 11.

When a base station and a mobile station start communicate with each other, the base station sets the transmission power increment Padd to an initial level 0 in step S301.

Then, it is decided whether a control command transmitted from the mobile station is being received in step S302. If a control command transmitted from the mobile station is being received, then a power ratio Rc between desired power of the control command and interference power is measured in step S303.

Since the base station determines an average of the power ratios Rc between desired power and interference power for Nave slots, the measured desired vs. interference power ratios Rc are held in a memory for a period of time corresponding to the Nave slots.

Then, the desired vs. interference power ratios Rc for the Nave slots are averaged to calculate an average desired vs. interference power ratio Rcave in step S304. Until the reception of the Nave slots is completed after the start of the communications, the average of the desired vs. interference power ratios Rc that are held in the memory is used as the average desired vs. interference power ratio Rcave.

Then, the identification number of a base station transmitted together with the control command from the mobile station is compared with the identification number of its own base station, deciding whether its own base station is a downlink or not in step S305.

If its own base station is not a downlink in step S305, then it is decided whether the average desired vs. interference power ratio Rcave is greater than the sum of the control target level Rctarget and Texc or not in step S306. If the average desired vs. interference power ratio Rcave is greater than the sum of the control target level Rctarget and Texc, then ΔPadd is added to the transmission power increment Padd in step S307. If the average desired vs. interference power ratio Rcave is not greater than the sum of the control target level Rctarget and Texc, then ΔPadd is subtracted from the transmission power increment Padd in step S308.

If its own base station is a downlink in step S305, then the link between its own base station and the mobile station is regarded as a main link whose propagation loss is minimum among those base stations whose links have been established with the mobile station. Then, control goes to step S308.

After step S307 or S308, it is decided whether the transmission power increment Padd is greater than a maximum level Paddmax thereof or not in step S309. If the transmission power increment Padd is greater than the maximum level Paddmax, then the transmission power increment Padd is set to the maximum level Paddmax in step S310.

If the transmission power increment Padd is not greater than the maximum level Paddmax in step S309, or after step S310, it is decided whether the transmission power increment Padd is smaller than 0 or not in step S311. If the transmission power increment Padd is smaller than 0, then the transmission power increment Padd is set to 0 in step S312.

If the transmission power increment Padd is not smaller than 0 in step S311, or after step S312, it is decided whether communications have been ended or not in step S313. If communications have been ended, then the processing sequence shown in FIG. 15 comes to an end. If communications have not been ended, then control returns to step S302.

A downlink propagation loss and an uplink propagation loss differ from each other due to different instantaneous level variations depending on the frequency even between the same base and mobile stations. In a mobile station under a soft handoff, e.g., the mobile station 30b, the downlink propagation loss may be greater for the base station 10a than for the base station 10b, and the uplink propagation loss may be greater for the base station 10b than for the base station 10a.

If the uplink and downlink propagation losses are thus inverted in magnitude, the SIR of a control command transmitted from the base station 10a is smaller than the SIR of a control command transmitted from the base station 10b in the mobile station 30b. Therefore, control commands transmitted from the base station 10a are subject to many decision errors.

At this time, as when a control command transmitted from the base station 10a is ignored, uplink transmission power in the mobile station is controlled on the basis of a control command transmitted from the base station 10b. Therefore, even if the SIR of a signal transmitted from the mobile station 30a is of a target level in the base station 10b, the SIR of a signal transmitted from the mobile station 30b may be of an excessive level greater than the target level in the base station 10a whose uplink propagation loss is smaller than that of the base station 10b.

The SIR of a signal transmitted from the mobile station 30b may be of an excessive level greater than the target level in the base station also when the propagation loss varies rapidly as the mobile station 30b moves and the transmission power cannot be controlled so as to follow the variations of the propagation loss.

According to the sixth embodiment, if the SIR of a signal transmitted from the mobile station 30b exceeds the target value by an amount equal to or greater than a predetermined value, and also if the link between its own base station and the mobile station is not a main link whose propagation loss is minimum among those base stations whose links have been established with the mobile station, the transmission power increment Padd is increased. Accordingly, when the uplink and downlink propagation losses are thus inverted in magnitude and the probability that a control command transmitted from its own base station to the mobile station is subject to a decision error is high, the control command is transmitted with large transmission power.

Consequently, in the mobile station 30b, the SIR of the control command is increased, increasing the probability that the control command can be determined accurately. In the mobile station 30b, therefore, transmission power is reduced on the basis of the control command transmitted from the base station 10a, and the SIR of a signal transmitted from the mobile station 30b approaches a target level in the base station 10a.

In this manner, an increase in the interference power due to excessive desired power in the base station can be suppressed.

Moreover, if the SIR of a signal transmitted from a mobile station is of a level greater than the target level owing to rapid variations of the propagation loss even though a control command transmitted from a base station is determined accurately in the mobile station, then since the probability that the control command is transmitted from the base station with large transmission power is small, the overall transmission power of the base station is not substantially increased, and hence the downlink interference power on other mobile stations is not substantially increased.

7th Embodiment

In a method of controlling transmission power in a cellular system according to a seventh embodiment of the present invention, a base station does not measure an SIR as an uplink reception quality, but measures desired power as an uplink reception quality. Other details of the method of controlling transmission power according to the seventh embodiment are identical to those of the method of controlling transmission power according to the sixth embodiment.

Each time a slot transmitted from a mobile station is received, the reception quality measuring unit 14 of each of the base stations 10a, 10b measures desired power Dc of the received slot as an uplink reception quality.

In step S303 shown in FIG. 15, uplink desired power Rc is measured. In step S304 shown in FIG. 15, an average Rcave of measured desired power levels Rc is calculated.

In step S306 shown in FIG. 15, it is decided whether Rcave>Rctarget+Texc where Rctarget is of a predetermined level.

Other details than described above are identical to those of the method of controlling transmission power according to the sixth embodiment. For the same reasons as described above with respect to the sixth embodiment, the method of controlling transmission power according to the seventh embodiment is capable of suppressing an increase in uplink interference power.

In the fourth through seventh embodiments, the transmission power of a base station is determined by the sum of the internal transmission power Pf and the transmission power increment Padd. The process of determining the internal transmission power Pf may not be limited to the illustrated process of incrementing or decrementing the internal transmission power Pf based on the control command transmitted from the mobile station.

Furthermore, the internal transmission power Pf may be determined such that it may be of a constant level at all times, rather than being varied. Alternatively, a control quantity for transmission power may be transmitted from a mobile station to a base station, and the internal transmission power Pf may be determined according to the control quantity in the base station. The internal transmission power Pf may be determined by any processes according to the present invention.

In the above embodiments, only the controlling of transmission power for transmitting a control command has been described. However, data other than control commands transmitted from base stations may be transmitted with the same power as the control commands.

While preferred embodiments of the present invention have been described using specific terms, such description is for illustrative purposes only, and it is to be understood that changes and variations may be made without departing from the spirit or scope of the following claims.

What is claimed is:

1. A method of controlling transmission power in a cellular system having a plurality of cells, a plurality of base stations disposed respectively in the cells, and a mobile station disposed in one of the cells and having a link established with one or more of said base stations for communicating therewith with a transmission power based on a first control command transmitted from the base station, comprising the steps of:

determining transmission power of the base stations based on a second control command transmitted from the mobile station;

measuring reception quality in the base stations of a signal transmitted from the mobile station;

comparing the measured reception quality with target reception quality;

determining an increment for the transmission power of the base stations which has been determined based on said second control command, based on a compared result;

incrementing the transmission power of the base stations by the determined increment; and transmitting the first control command for controlling transmission power of the mobile station from the base stations to the mobile station, with the incremented transmission power.

2. A method according to claim 1, wherein a signal to be transmitted from said base stations to said mobile stations is transmitted with power with which said first control command is transmitted.

3. A method according to claim 1, wherein when first command signals are received from the base stations, the transmission power is controlled in the mobile station based on one of said first command signals which has at least a predetermined level of reception quality.

4. A method according to claim 3, wherein a signal to be transmitted from said base stations to said mobile stations is transmitted with power with which said first control command is transmitted.

5. A method according to claim 3, wherein said reception quality is represented by a power ratio between reception power in the base stations of a signal transmitted from said mobile station and interference power, and said increment is increased by a ratio between said power ratio and a target power ratio.

6. A method according to claim 5, wherein a signal to be transmitted from said base stations to said mobile stations is transmitted with power with which said first control command is transmitted.

7. A method according to claim 5, wherein if said transmission power incremented by said increment is greater than predetermined maximum power, then said transmission power is set to said predetermined maximum power.

8. A method according to claim 7, wherein a signal to be transmitted from said base stations to said mobile stations is transmitted with power with which said first control command is transmitted.

9. A method according to claim 5, wherein if said ratio between said power ratio and said target power ratio is greater than 1, then said increment is set to said ratio between said power ratio and said target power ratio.

10. A method according to claim 9, wherein a signal to be transmitted from said base stations to said mobile stations is transmitted with power with which said first control command is transmitted.

11. A method according to claim 9, wherein if said transmission power incremented by said increment is greater than predetermined maximum power, then said transmission power is set to said predetermined maximum power.

12. A method according to claim 11, wherein a signal to be transmitted from said base stations to said mobile stations is transmitted with power with which said first control command is transmitted.

13. A method according to claim 3, wherein said reception quality is represented by the reception power in the base stations of a signal transmitted from said mobile station, and said increment is increased by a ratio between said reception power and said target reception power.

14. A method according to claim 13, wherein a signal to be transmitted from said base stations to said mobile stations is transmitted with power with which said first control command is transmitted.

15. A method according to claim 13, wherein if said ratio between said reception power and said target reception power is greater than 1, then said increment is set to said ratio between said reception power and said target reception power.

16. A method according to claim 15, wherein a signal to be transmitted from said base stations to said mobile stations is transmitted with power with which said first control command is transmitted.

17. A method according to claim 13, wherein if said transmission power incremented by said increment is greater than predetermined maximum power, then said transmission power is set to said predetermined maximum power.

18. A method according to claim 17, wherein a signal to be transmitted from said base stations to said mobile stations is transmitted with power with which said first control command is transmitted.

19. A method according to claim 1, wherein when first command signals are received from the base stations, the transmission power is controlled in the mobile station based on one of said first command signals which serves to minimize the transmission power of the mobile station.

20. A method according to claim 19, wherein a signal to be transmitted from said base stations to said mobile stations is transmitted with power with which said first control command is transmitted.

21. A method according to claim 19, wherein said reception quality is represented by a power ratio between reception power in the base stations of a signal transmitted from said mobile station and interference power, and said increment is increased by a ratio between said power ratio and a target power ratio.

22. A method according to claim 21, wherein a signal to be transmitted from said base stations to said mobile stations is transmitted with power with which said first control command is transmitted.

23. A method according to claim 21, wherein if said transmission power incremented by said increment is greater than predetermined maximum power, then said transmission power is set to said predetermined maximum power.

24. A method according to claim 23, wherein a signal to be transmitted from said base stations to said mobile stations is transmitted with power with which said first control command is transmitted.

25. A method according to claim 21, wherein if said ratio between said power ratio and said target power ratio is greater than 1, then said increment is set to said ratio between said power ratio and said target power ratio.

26. A method according to claim 25, wherein a signal to be transmitted from said base stations to said mobile stations is transmitted with power with which said first control command is transmitted.

27. A method according to claim 25, wherein if said transmission power incremented by said increment is greater than predetermined maximum power, then said transmission power is set to said predetermined maximum power.

28. A method according to claim 27, wherein a signal to be transmitted from said base stations to said mobile stations is transmitted with power with which said first control command is transmitted.

29. A method according to claim 19, wherein said reception quality is represented by the reception power in the base stations of a signal transmitted from said mobile station, and said increment is increased by a ratio between said reception power and said target reception power.

30. A method according to claim 29, wherein a signal to be transmitted from said base stations to said mobile stations is transmitted with power with which said first control command is transmitted.

31. A method according to claim 29, wherein if said ratio between said reception power and said target reception power is greater than 1, then said increment is set to said ratio between said reception power and said target reception power.

32. A method according to claim 31, wherein a signal to be transmitted from said base stations to said mobile stations is transmitted with power with which said first control command is transmitted.

33. A method according to claim 29, wherein if said transmission power incremented by said increment is greater than predetermined maximum power, then said transmission power is set to said predetermined maximum power.

34. A method according to claim 33, wherein a signal to be transmitted from said base stations to said mobile stations is transmitted with power with which said first control command is transmitted.

35. A method according to claim 1, wherein when first command signals are received from the base stations, the transmission power is controlled in the mobile station based on one of said first command signals which has at least a predetermined level of reception quality and which serves to minimize the transmission power of the mobile station.

36. A method according to claim 35, wherein a signal to be transmitted from said base stations to said mobile stations is transmitted with power with which said first control command is transmitted.

37. A method according to claim 35, wherein said reception quality is represented by a power ratio between reception power in the base stations of a signal transmitted from said mobile station and interference power, and said increment is increased by a ratio between said power ratio and a target power ratio.

38. A method according to claim 37, wherein a signal to be transmitted from said base stations to said mobile stations is transmitted with power with which said first control command is transmitted.

39. A method according to claim 37, wherein if said transmission power incremented by said increment is greater than predetermined maximum power, then said transmission power is set to said predetermined maximum power.

40. A method according to claim 39, wherein a signal to be transmitted from said base stations to said mobile stations is transmitted with power with which said first control command is transmitted.

41. A method according to claim 37, wherein if said ratio between said power ratio and said target power ratio is greater than 1, then said increment is set to said ratio between said power ratio and said target power ratio.

42. A method according to claim 41, wherein a signal to be transmitted from said base stations to said mobile stations is transmitted with power with which said first control command is transmitted.

43. A method according to claim 41, wherein if said transmission power incremented by said increment is greater than predetermined maximum power, then said transmission power is set to said predetermined maximum power.

44. A method according to claim 43, wherein a signal to be transmitted from said base stations to said mobile stations is transmitted with power with which said first control command is transmitted.

45. A method according to claim 35, wherein said reception quality is represented by the reception power in the base stations of a signal transmitted from said mobile station, and said increment is increased by a ratio between said reception power and said target reception power.

46. A method according to claim 45, wherein a signal to be transmitted from said base stations to said mobile stations is transmitted with power with which said first control command is transmitted.

47. A method according to claim 45, wherein if said ratio between said reception power and said target reception power is greater than 1, then said increment is set to said ratio between said reception power and said target reception power.

48. A method according to claim 47, wherein a signal to be transmitted from said base stations to said mobile stations is transmitted with power with which said first control command is transmitted.

49. A method according to claim 45, wherein if said transmission power incremented by said increment is greater than predetermined maximum power, then said transmission power is set to said predetermined maximum power.

50. A method according to claim 49, wherein a signal to be transmitted from said base stations to said mobile stations is transmitted with power with which said first control command is transmitted.

51. A method according to claim 1, wherein said reception quality is represented by a power ratio between reception power in the base stations of a signal transmitted from said mobile station and interference power, and said increment is increased by a ratio between said power ratio and a target power ratio.

52. A method according to claim 51, wherein a signal to be transmitted from said base stations to said mobile stations is transmitted with power with which said first control command is transmitted.

53. A method according to claim 51, wherein if said transmission power incremented by said increment is greater than predetermined maximum power, then said transmission power is set to said predetermined maximum power.

54. A method according to claim 53, wherein a signal to be transmitted from said base stations to said mobile stations is transmitted with power with which said first control command is transmitted.

55. A method according to claim 51, wherein if said ratio between said power ratio and said target power ratio is greater than 1, then said increment is set to said ratio between said power ratio and said target power ratio.

56. A method according to claim 55, wherein a signal to be transmitted from said base stations to said mobile stations is transmitted with power with which said first control command is transmitted.

57. A method according to claim 55, wherein if said transmission power incremented by said increment is greater than predetermined maximum power, then said transmission power is set to said predetermined maximum power.

58. A method according to claim 57, wherein a signal to be transmitted from said base stations to said mobile stations is transmitted with power with which said first control command is transmitted.

59. A method according to claim 1, wherein said reception quality is represented by the reception power in the base stations of a signal transmitted from said mobile station, and said increment is increased by a ratio between said reception power and said target reception power.

60. A method according to claim 59, wherein a signal to be transmitted from said base stations to said mobile stations is transmitted with power with which said first control command is transmitted.

61. A method according to claim 59, wherein if said ratio between said reception power and said target reception power is greater than 1, then said increment is set to said ratio between said reception power and said target reception power.

62. A method according to claim 61, wherein a signal to be transmitted from said base stations to said mobile stations is transmitted with power with which said first control command is transmitted.

63. A method according to claim 59, wherein if said transmission power incremented by said increment is greater than predetermined maximum power, then said transmission power is set to said predetermined maximum power.

64. A method according to claim 63, wherein a signal to be transmitted from said base stations to said mobile stations is transmitted with power with which said first control command is transmitted.

65. A method according to claim 1, wherein said reception quality is represented by a power ratio between reception power in the base stations of a signal transmitted from said mobile station and interference power, and wherein if said power ratio is greater than a level which is greater than a target power ratio by a predetermined value, then said increment is increased, and if said power ratio is smaller than a level which is greater than a target power ratio by a predetermined value, then said increment is reduced.

66. A method according to claim 65, wherein a signal to be transmitted from said base stations to said mobile stations is transmitted with power with which said first control command is transmitted.

67. A method according to claim 65, wherein if said increment is greater than a predetermined maximum value, then said increment is set to said predetermined maximum value, and if said increment is of a value for not increasing said transmission power, then said transmission power is not incremented by said increment.

68. A method according to claim 67, wherein a signal to be transmitted from said base stations to said mobile stations is transmitted with power with which said first control command is transmitted.

69. A method according to claim 1, wherein said reception quality is represented by the reception power in the base stations of a signal transmitted from said mobile station, and wherein if said reception power is greater than a level which is greater than target reception power by a predetermined value, then said increment is increased, and if said reception power is smaller than a level which is greater than target reception power by a predetermined value, then said increment is reduced.

70. A method according to claim 69, wherein a signal to be transmitted from said base stations to said mobile stations is transmitted with power with which said first control command is transmitted.

71. A method according to claim 69, wherein if said increment is greater than a predetermined maximum value, then said increment is set to said predetermined maximum value, and if said increment is of a value for not increasing said transmission power, then said transmission power is not incremented by said increment.

72. A method according to claim 71, wherein a signal to be transmitted from said base stations to said mobile stations is transmitted with power with which said first control command is transmitted.

73. A method according to claim 1, wherein said reception quality is represented by a power ratio between reception power in the base stations of a signal transmitted from said mobile station and interference power, and wherein if a propagation loss with said mobile station is not minimum among the base stations having respective links established with the mobile station and also if said power ratio is greater than a level which is greater than a target power ratio by a predetermined value, then said increment is increased, and if a propagation loss with said mobile station is minimum among the base stations having respective links established with the mobile station and if said power ratio is smaller than a level which is greater than a target power ratio by a predetermined value, then said increment is reduced.

74. A method according to claim 73, wherein a signal to be transmitted from said base stations to said mobile stations is transmitted with power with which said first control command is transmitted.

75. A method according to claim 73, wherein if said increment is greater than a predetermined maximum value, then said increment is set to said predetermined maximum value, and if said increment is of a value for not increasing said transmission power, then said transmission power is not incremented by said increment.

76. A method according to claim 75, wherein a signal to be transmitted from said base stations to said mobile stations is transmitted with power with which said first control command is transmitted.

77. A method according to claim 1, wherein said reception quality is represented by the reception power in the base stations of a signal transmitted from said mobile station, and wherein if a propagation loss with said mobile station is not minimum among the base stations having respective links established with the mobile station and also if said reception power is greater than a level which is greater than target reception power by a predetermined value, then said increment is increased, and if a propagation loss with said mobile station is minimum among the base stations having respective links established with the mobile station and if said reception power is smaller than a level which is greater than target reception power by a predetermined value, then said increment is reduced.

78. A method according to claim 77, wherein a signal to be transmitted from said base stations to said mobile stations is transmitted with power with which said first control command is transmitted.

79. A method according to claim 77, wherein if said increment is greater than a predetermined maximum value, then said increment is set to said predetermined maximum value, and if said increment is of a value for not increasing said transmission power, then said transmission power is not incremented by said increment.

80. A method according to claim 79, wherein a signal to be transmitted from said base stations to said mobile stations is transmitted with power with which said first control command is transmitted.

81. A method of controlling transmission power in a cellular system having a plurality of cells, a plurality of base stations disposed respectively in the cells, and a mobile station disposed in one of the cells and having a link established with one or more of said base stations for communicating therewith, by setting transmission power from the base stations to a level which is the sum of transmission power determined by a closed loop in the cellular system and an increment added thereto, and transmitting a signal from the base stations to the mobile stations with the transmission power thus set, comprising the steps of:

measuring reception quality of a signal transmitted from said mobile station;

comparing the measured reception quality with a value which is the sum of target reception quality and a predetermined value added thereto;

if the measured reception quality is greater than said value which is the sum of the target reception quality and the predetermined value added thereto, adding a predetermined additive value to said increment; and if the measured reception quality is smaller than said value which is the sum of the target reception quality and the predetermined value added thereto, subtracting a predetermined subtractive value from said increment.

82. A method according to claim 81, wherein if said increment is greater than a predetermined value, then said increment is set to a maximum, and if said increment is smaller than 0, then said increment is set to 0.

83. A base station apparatus comprising:

transmitting means for transmitting a first control command for controlling transmission power of a mobile station disposed in a cell, to the mobile station;

receiving means for receiving a signal transmitted from said mobile station;

reception quality measuring means for measuring reception quality of a signal received by said receiving means, and comparing the measured reception quality with target reception quality; and transmission power controlling means for determining power with which to transmit said first control command, based on a second control command containing in a signal received by said receiving means, determining an increment for transmission power determined based on said second control command, based on a compared result from said reception quality measuring means, and incrementing the transmission power based on said second control command by said increment;

said transmitting means comprising means for transmitting said first control command to said mobile station with the transmission power incremented by said transmission power controlling means.

84. A base station apparatus according to claim 83, wherein said transmitting means comprises means for transmitting a signal to be transmitted to said mobile station with power with which said first control command is transmitted.

85. A base station apparatus according to claim 83, wherein said transmission power controlling means comprises means for representing the reception quality with a power ratio between reception power of a signal transmitted from said mobile station and interference power, and increasing said increment by a ratio between said power ratio and a target power ratio.

86. A base station apparatus according to claim 85, wherein said transmitting means comprises means for transmitting a signal to be transmitted to said mobile station with power with which said first control command is transmitted.

87. A base station apparatus according to claim 83, wherein said transmission power controlling means comprises means for representing the reception quality with reception power of a signal transmitted from said mobile station, and increasing said increment by a ratio between said reception power and target reception power.

88. A base station apparatus according to claim 87, wherein said transmitting means comprises means for transmitting a signal to be transmitted to said mobile station with power with which said first control command is transmitted.

89. A base station apparatus according to claim 83, wherein said transmission power controlling means comprises means for representing the reception quality with a power ratio between reception power of a signal transmitted from said mobile station and interference power, increasing said increment if said power ratio is greater than a level which is greater than a target power ratio by a predetermined value, and reducing said increment if said power ratio is smaller than a level which is greater than a target power ratio by a predetermined value.

90. A base station apparatus according to claim 89, wherein said transmitting means comprises means for transmitting a signal to be transmitted to said mobile station with power with which said first control command is transmitted.

91. A base station apparatus according to claim 83, wherein said transmission power controlling means comprises means for representing the reception quality with reception power of a signal transmitted from said mobile station, increasing said increment if said reception power is greater than a level which is greater than target reception power by a predetermined value, and reducing said increment if said reception power is smaller than a level which is greater than target reception power by a predetermined value.

92. A base station apparatus according to claim 91, wherein said transmitting means comprises means for transmitting a signal to be transmitted to said mobile station with power with which said first control command is transmitted.

93. A base station apparatus according to claim 83, wherein said transmission power controlling means comprises means for representing the reception quality with a power ratio between reception power of a signal transmitted from said mobile station and interference powers increasing said increment if a propagation loss with said mobile station is not minimum among the base stations having respective links established with the mobile station and also if said power ratio is greater than a level which is greater than a target power ratio by a predetermined value, and reducing said increment if a propagation loss with said mobile station is minimum among the base stations having respective links established with the mobile station and if said power ratio is smaller than a level which is greater than a target power ratio by a predetermined value.

94. A base station apparatus according to claim 93, wherein said transmitting means comprises means for transmitting a signal to be transmitted to said mobile station with power with which said first control command is transmitted.

95. A base station apparatus according to claim 83, wherein said transmission power controlling means comprises means for representing the reception quality with reception power of a signal transmitted from said mobile station, increasing said increment if a propagation loss with said mobile station is not minimum among the base stations having respective links established with the mobile station and also if said reception power is greater than a level which is greater than target reception power by a predetermined value, and reducing said increment if a propagation loss with said mobile station is minimum among the base stations having respective links established with the mobile station and if said reception power is smaller than a level which is greater than target reception power by a predetermined value.

96. A base station apparatus according to claim 95, wherein said transmitting means comprises means for transmitting a signal to be transmitted to said mobile station with power with which said first control command is transmitted.

97. A base station apparatus according to claim 83, wherein said transmission power controlling means comprises means for determining said first control command based on the compared result from said reception quality measuring means.

98. A base station apparatus according to claim 97, wherein said transmitting means comprises means for transmitting a signal to be transmitted to said mobile station with power with which said first control command is transmitted.

99. A base station apparatus according to claim 97, wherein said transmission power controlling means comprises means for representing the reception quality with a power ratio between reception power of a signal transmitted from said mobile station and interference power, and increasing said increment by a ratio between said power ratio and a target power ratio.

100. A base station apparatus according to claim 99, wherein said transmitting means comprises means for transmitting a signal to be transmitted to said mobile station with power with which said first control command is transmitted.

101. A base station apparatus according to claim 97, wherein said transmission power controlling means comprises means for representing the reception quality with reception power of a signal transmitted from said mobile station, and increasing said increment by a ratio between said reception power and target reception power.

102. A base station apparatus according to claim 101, wherein said transmitting means comprises means for transmitting a signal to be transmitted to said mobile station with power with which said first control command is transmitted.

103. A base station apparatus according to claim 97, wherein said transmission power controlling means comprises means for representing the reception quality with a power ratio between reception power of a signal transmitted from said mobile station and interference power, increasing said increment if said power ratio is greater than a level which is greater than a target power ratio by a predetermined value, and reducing said increment if said power ratio is smaller than a level which is greater than a target power ratio by a predetermined value.

104. A base station apparatus according to claim 103, wherein said transmitting means comprises means for transmitting a signal to be transmitted to said mobile station with power with which said first control command is transmitted.

105. A base station apparatus according to claim 97, wherein said transmission power controlling means comprises means for representing the reception quality with reception power of a signal transmitted from said mobile station, increasing said increment if said reception power is greater than a level which is greater than target reception power by a predetermined value, and reducing said increment if said reception power is smaller than a level which is greater than target reception power by a predetermined value.

106. A base station apparatus according to claim 105, wherein said transmitting means comprises means for transmitting a signal to be transmitted to said mobile station with power with which said first control command is transmitted.

107. A base station apparatus according to claim 97, wherein said transmission power controlling means comprises means for representing the reception quality with a power ratio between reception power of a signal transmitted from said mobile station and interference power, increasing said increment if a propagation loss with said mobile station is not minimum among the base stations having respective links established with the mobile station and also if said power ratio is greater than a level which is greater than a target power ratio by a predetermined value, and reducing said increment if a propagation loss with said mobile station is minimum among the base stations having respective links established with the mobile station and if said power ratio is smaller than a level which is greater than a target power ratio by a predetermined value.

108. A base station apparatus according to claim 107, wherein said transmitting means comprises means for transmitting a signal to be transmitted to said mobile station with power with which said first control command is transmitted.

109. A base station apparatus according to claim 97, wherein said transmission power controlling means comprises means for representing the reception quality with reception power of a signal transmitted from said mobile station, increasing said increment if a propagation loss with said mobile station is not minimum among the base stations having respective links established with the mobile station and also if said reception power is greater than a level which is greater than target reception power by a predetermined value, and reducing said increment if a propagation loss with said mobile station is minimum among the base stations having respective links established with the mobile station and if said reception power is smaller than a level which is greater than target reception power by a predetermined value.

110. A base station apparatus according to claim 109, wherein said transmitting means comprises means for transmitting a signal to be transmitted to said mobile station with power with which said first control command is transmitted.

* * * * *